United States Patent
Miyake et al.

(10) Patent No.: US 6,546,145 B1
(45) Date of Patent: *Apr. 8, 2003

(54) IMAGE COMPRESSION USING SELECTION OF QUANTIZATION METHOD

(75) Inventors: Nobutaka Miyake, Yokohama (JP); Tadayoshi Nakayama, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/334,031

(22) Filed: Nov. 2, 1994

Related U.S. Application Data

(63) Continuation of application No. 07/828,709, filed on Jan. 31, 1992, now abandoned.

(30) Foreign Application Priority Data

| Feb. 5, 1991 | (JP) | 3-014546 |
| Feb. 5, 1991 | (JP) | 3-014547 |

(51) Int. Cl.$^7$ .................................................. G06K 9/06
(52) U.S. Cl. ...................................... 382/248; 382/239
(58) Field of Search ................................ 382/276, 279, 382/302, 232, 180, 239, 248, 250, 251, 176, 171, 233, 235, 236, 238, 244, 277, 280; 358/261.1, 261.2, 261.3, 426, 432, 433, 430, 462, 429, 261.4, 467, 455

(56) References Cited

U.S. PATENT DOCUMENTS

| 5,021,891 A | * | 6/1991 | Lee ............................. 382/41 |
| 5,046,121 A | * | 9/1991 | Yonekawa et al. ............. 382/56 |
| 5,107,345 A | * | 4/1992 | Lee ............................. 382/41 |
| 5,121,216 A | * | 6/1992 | Chen et al. ............... 358/261.3 |
| 5,157,743 A | | 10/1992 | Maeda et al. .................. 382/56 |
| 5,162,923 A | | 11/1992 | Yoshida et al. ............. 358/433 |
| 5,384,868 A | | 1/1995 | Maeda et al. .................. 382/56 |

FOREIGN PATENT DOCUMENTS

| JP | 3-283989 | 12/1991 |

OTHER PUBLICATIONS

"International Standardization for Color Photographic Coding", in The Journal of the Institute of Image Electronic Engineers of Japan, vol. 18, No. 6, pp. 398–407, Yasuda, 1989.

* cited by examiner

Primary Examiner—Phuoc Tran
(74) Attorney, Agent, or Firm—Fitzpatrick, Cella, Harper & Scinto

(57) ABSTRACT

An image compressing apparatus including an input unit for inputting a plurality of spatial frequency component data of a block which is one of a plurality of blocks constituting an image, a discriminating unit for discriminating an image type of the block according to the spatial frequency component data input by the inputting unit with a predetermined value, a selecting unit for selecting one quantizing method from among a plurality of different quantizing methods, which respectively correspond to a plurality of image types, in accordance with the image type discriminated by the discriminating unit, and a quantizing unit for quantizing the spatial frequency component data of the block input by the inputting unit in accordance with the quantizing unit selected by the selecting unit.

24 Claims, 21 Drawing Sheets

| | | | | | | | |
|---|---|---|---|---|---|---|---|
| 76 | 95 | 126 | 149 | 159 | 163 | 167 | 169 |
| 35 | 33 | 53 | 84 | 106 | 115 | 120 | 122 |
| 30 | 27 | 64 | 125 | 166 | 178 | 183 | 185 |
| 31 | 34 | 94 | 177 | 224 | 235 | 240 | 242 |
| 32 | 36 | 98 | 181 | 225 | 236 | 242 | 245 |
| 32 | 32 | 83 | 150 | 188 | 199 | 204 | 207 |
| 33 | 25 | 50 | 86 | 109 | 118 | 123 | 124 |

FIG. 9A

| | | | | | | | |
|---|---|---|---|---|---|---|---|
| 80 | 119 | 49 | 301 | 64 | 38 | -25 | 0 |
| -420 | 110 | 122 | -73 | 12 | -3 | 23 | 3 |
| -120 | 21 | 27 | -39 | 5 | 5 | 12 | 1 |
| 18 | -22 | -20 | -8 | 4 | 5 | 2 | 1 |
| 39 | -21 | -18 | 5 | 0 | 2 | -1 | 0 |
| 16 | -8 | -4 | 2 | -1 | -1 | 0 | 0 |
| 3 | -2 | 1 | 0 | -1 | 0 | 0 | 0 |
| 2 | -1 | 0 | -1 | 0 | 0 | 0 | 0 |

FIG. 9B

| 200 | 200 | 255 | 255 | 255 | 50 | 50 | 50 |
|---|---|---|---|---|---|---|---|
| 200 | 200 | 200 | 255 | 255 | 255 | 50 | 50 |
| 200 | 200 | 200 | 200 | 255 | 255 | 50 | 50 |
| 200 | 200 | 200 | 200 | 255 | 255 | 255 | 255 |
| 200 | 200 | 200 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |
| 255 | 255 | 255 | 255 | 255 | 255 | 255 | 255 |

FIG. 10A

| 727 | -274 | -52 | 28 | 12 | -1 | -32 | -52 |
|---|---|---|---|---|---|---|---|
| 104 | 176 | 153 | 13 | -63 | 3 | 60 | 36 |
| -159 | -165 | -53 | 20 | 49 | 39 | -8 | -37 |
| 52 | 32 | -43 | -78 | -65 | -36 | -10 | 4 |
| 39 | 42 | 28 | 34 | 26 | 3 | 1 | 11 |
| -42 | -40 | 4 | 35 | 27 | 0 | -11 | -5 |
| 23 | 23 | -8 | -45 | -48 | -19 | 2 | 3 |
| -5 | 4 | 21 | 33 | 47 | 50 | 23 | -3 |

FIG. 10B

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 113 | 92 |
| 49 | 64 | 78 | 87 | 103 | 121 | 120 | 101 |
| 72 | 92 | 95 | 98 | 112 | 100 | 103 | 99 |

FIG. 11A

| | | | | | | | |
|---|---|---|---|---|---|---|---|
| 16 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |

FIG. 11B

EXAMPLE OF QUANTIZATION TABLE 110

| 16 | 32 | 32 | 32 | 32 | 32 | 32 | 32 |
|----|----|----|----|----|----|----|----|
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |
| 32 | 32 | 32 | 32 | 32 | 32 | 32 | 32 |

FIG. 13A

EXAMPLE OF QUANTIZATION TABLE 111

| 16 | 20 | 20 | 20 | 20 | 20 | 20 | 40 |
|----|----|----|----|----|----|----|----|
| 20 | 20 | 20 | 20 | 20 | 20 | 40 | 40 |
| 20 | 20 | 20 | 20 | 20 | 40 | 40 | 40 |
| 20 | 20 | 20 | 20 | 40 | 40 | 40 | 40 |
| 20 | 20 | 20 | 40 | 40 | 40 | 40 | 40 |
| 20 | 20 | 40 | 40 | 40 | 40 | 40 | 40 |
| 20 | 40 | 40 | 40 | 40 | 40 | 40 | 40 |
| 40 | 40 | 40 | 40 | 40 | 40 | 40 | 40 |

FIG. 13B

EXAMPLE OF QUANTIZATION TABLE 112

| 16 | 20 | 20 | 20 | 20 | 30 | 30 | 40 |
|----|----|----|----|----|----|----|----|
| 20 | 20 | 20 | 20 | 30 | 30 | 40 | 40 |
| 20 | 20 | 20 | 30 | 30 | 40 | 40 | 50 |
| 20 | 20 | 30 | 30 | 40 | 40 | 50 | 50 |
| 20 | 30 | 30 | 40 | 40 | 50 | 50 | 60 |
| 30 | 30 | 40 | 40 | 50 | 50 | 60 | 60 |
| 30 | 40 | 40 | 50 | 50 | 60 | 60 | 60 |
| 40 | 40 | 50 | 50 | 60 | 60 | 60 | 60 |

FIG. 13C

EXAMPLE OF QUANTIZATION TABLE 113

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 113 | 92  |
| 49 | 64 | 78 | 87 | 103 | 121 | 120 | 101 |
| 72 | 92 | 95 | 98 | 112 | 100 | 103 | 99  |

FIG. 13D

EXAMPLE OF QUANTIZATION TABLE 109

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 113 | 92  |
| 49 | 64 | 78 | 87 | 103 | 121 | 120 | 101 |
| 72 | 92 | 95 | 98 | 112 | 100 | 103 | 99  |

FIG. 15A

EXAMPLE OF QUANTIZATION TABLE 110

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG. 15B ic IMAGE COMPRESSION USING SELECTION OF QUANTIZATION METHOD

This application is a continuation, of application Ser. No. 07/828,709, filed Jan. 31, 1992, now abandoned.

BACKGROUND OF THE INVENTION

1. Field of the Invention

This invention relates to an image compressing apparatus, such as an image compressing apparatus having an orthogonal transformation function, and to the method of image compression used therein.

2. Description of the Related Art

The memory capacity necessary for storing a full color image (hereinafter referred to as an "image") such as a photograph in a memory is calculated by multiplying the number of pixels by the number of tone bits. This makes necessary an enormous memory capacity in order to store such a high-quality color image. For this reason, a variety of methods of compressing the amount of information have been proposed. For example, attempts have been made to reduce the required memory capacity by first compressing the image information and then storing the compressed information in memory.

FIG. 1 is a block diagram showing the coding method (see "International Standardization for Color Photographic Coding", Hiroshi Yasuda, The Journal of the Institute of Image Electronics Engineers of Japan, Vol. 18, No. 6, pp. 398–407, 1989) of a baseline system proposed by the JPEG (Joint Photographic Experts Group) as a method of achieving international standardization of color still-picture coding.

As shown in FIG. 1, pixel data entered from an input terminal 1 is cut into 8×8 pixel blocks in a block forming circuit 2, the data is subjected to a cosine transformation by a discrete cosine transformation (hereinafter referred to as "DCT") circuit 17, and the transformation coefficients obtained by the transformation are supplied to a quantization (hereinafter referred to as "Q") unit 40. In accordance with quantization-step information supplied by a quantization table 41, the Q unit 40 subjects the transformation coefficients to linear quantization. Of the quantized transformation coefficients, a DC coefficient is applied to a predictive coding circuit [hereinafter referred to as a "DPCM (differential pulse-coded modulation) circuit"] 42, which obtains the differential (a prediction error) between this DC coefficient and the DC component of the preceding block. The difference is applied to a one-dimensional Huffman coding circuit 43.

FIG. 2 is a block diagram showing the details of the DPCM 42. The quantized DC coefficient from the Q unit 40 is applied to a delay circuit 53 and a subtracter 54. The delay circuit 53 applies a delay equivalent to the time needed for the discrete cosine transformation circuit to operate on one block, namely 8×8 pixels. Accordingly, the delay circuit 53 supplies the subtracter 54 with the DC coefficient of the preceding block. As a result, the subtracter 54 outputs the differential (prediction error) between the DC coefficient of the current block and that of the preceding block. In this predictive coding, the value of the preceding block is used as the prediction value, and therefore the predicting unit is constituted by the delay circuit, as set forth above.

In accordance with a DC Huffman code table 44, the one-dimensional Huffman coding circuit 43 applies variable-length coding to the prediction error signal supplied by the DPCM 42 and supplies a multiplexer 51 with the data, i.e., a DC Huffman code, that has been variable-length coded.

An AC coefficient (a coefficient other than the DC coefficient) quantized by the Q unit 40 is zigzag-scanned in order from coefficients of lower order, as shown in FIG. 3, by means of a scan converting circuit 45, and the output of the scan converting circuit 45 is applied to a significant-coefficient detector circuit 46. The latter determines whether the quantized AC coefficient is "0" or not. If the AC coefficient is "0", a count-up signal is supplied to a run-length counter 47, thereby incrementing the counter. If the coefficient is "1", however, a reset signal is applied to the run-length counter 47 to reset the counter, and the coefficient is split into a group number SSSS and annexed bits, as shown in FIG. 4, by a grouping circuit 48. The group number SSSS is supplied to a two-dimensional Huffman coding circuit 49, and the annexed bits are supplied to the multiplexer 51. The run-length counter 47 counts a "0" run length and supplies the two-dimensional Huffman coding circuit 49 with the number NNNN of consecutive "0" between significant coefficients other than "0". In accordance with the AC Huffman code table 50, the Huffman coding circuit 49 applies variable-length coding to the "0" run length NNNN and the significant-coefficient group number SSSS of significant coefficients and supplies the multiplexer 51 with the data, i.e., an AC Huffman code, that has been variable-length coded.

The multiplexer 51 multiplexes the DC Huffman code, AC Huffman code and annexed bits of one block (8×8 input pixels) and outputs the multiplexed data, namely compressed image data, from its output terminal 52. Accordingly, the compressed data outputted by the output terminal 52 is stored in a memory, and at read-out the data is expanded by a reverse operation, thereby making it possible to reduce memory capacity.

However, the example of the prior art described above has a disadvantage. For example, consider application of the prior art to an image output unit. In general, an image output unit often is connected to an image input unit such as a host computer or image scanner and operates as part of a system. In such case, various images, such as computer graphics produced by the host computer or images inputted from the image scanner are sent to the image output unit.

The prior art described above is such that a deterioration in image quality is suppressed in an image of the kind in which the transformation coefficients concentrate in the low region of the orthogonal transformation, as in an image obtained by digitizing an image such as a photograph by an image scanner. However, in artificially created images such as computer graphics, font images and images resulting from computer-aided design, images that have been compressed and then restored by expansion experience a major deterioration in quality.

Though means has been proposed in U.S. patent application Ser. No. 07/738,562 by the same assignee as this case for changing over the quantization conditions adaptively depending upon the level of transformation coefficients, this proposal also possesses a drawback. Specifically, since a sampled image is dealt with as an input source, the arrangement is such that the sensed portion of the image is distinguished as being an edge portion or a flat portion of the image on the basis of the transformation coefficients. The input source, i.e., the sampled image, which has entered from a device such as an image scanner is outputted as an image in which edge portions are weakened, no matter how significant the edge portions are in the original, owing to the characteristics of the MTF (modulation transmission function) of the image scanner. Consequently, image quality will not be affected that much even if the high-frequency components within a block are quantized coarsely to a small degree. However, an artificially produced image often contains strong AC power in high-frequency components which do not occur at the edge portions of an image inputted by a device such as an image scanner, namely an image having ordinary low to intermediate resolution. When the conventional coarse quantization is applied to these images, deleterious effects become conspicuous, such as the interruption of artificially produced fine lines and the occurrence of noise such as ringing in flat portions in the vicinity of fine lines. In addition, a simple method which involves little time loss has not been proposed with regard to the requirements for changing over the quantization conditions based upon the transformation coefficients.

The prior art described has the following drawbacks as well.

A half-tone image obtained by inputting an original such as a photograph using a device such as an image scanner tends to have its coefficients concentrated in the low-frequency region of the orthogonally transformed block, and therefore the occurrence of significant coefficients concentrates in the relatively lower orders so that the higher orders often are all consecutive In this case, when the "0" run is 16 or greater, an "R16" code is allocated, as shown in FIG. 4, and a "0" run counter is reset after the code is transmitted so that the run length of "0" is counted again. When a significant coefficient other than "0" is subsequently generated, two-dimensional Huffman coding is performed using this significant coefficient and the run length of "0"s which continue up to this coefficient.

Consequently, in zigzag scanning of the kind shown in FIG. 3, in which scanning is performed sequentially from lower order coefficients, the art is such that even if the occurrence of significant coefficients ends midway, whether or not significant coefficients have occurred in the subsequent higher order coefficients is unknown, and therefore preparations must be made for coding of "R16" by counting the number of "0" every coefficient. More specifically, in sequential zigzag scanning from the lower order coefficients, it cannot be ascertained up to what point the significant coefficients other than "0" have been generated, i.e., up to what point coding should be performed, unless scanning is carried out up to the highest order coefficient one time. In a case where the highest order coefficient is a coefficient other than "0", the coding of R16 and the coding of the ensuing "0" run must be performed if the "0" run is equal to or greater than 16, based on the run length of "0" stored thus far. In a case where the highest order coefficient also is "0", the "0" run stored thus far is reset and an "EOB" (end of block) code (shown in FIG. 4) must be generated. That is, there are cases where the time required for coding within a block changes at the end. In other words, coding cannot be performed within a fixed time period every time.

SUMMARY OF THE INVENTION

An object of the present invention is to provide an image compressing apparatus that is capable of eliminating the aforementioned drawbacks of the prior art described above.

Another object of the present invention is to provide an image compressing apparatus in which the edges of such artificially created images as characters, fonts and line drawings can be outputted in excellent fashion and suitable quantization can be realized by a simple arrangement regardless of the input source from which an image is received.

Still another object of the present invention is to provide an image compressing apparatus in which coding can be performed in a predetermined period of time regardless of the kind of information within a block, and in which the circuitry can be constructed inexpensively and in simple fashion.

One aspect of the present invention provides an image compressing apparatus comprising input means for inputting a plurality of spatial frequency component data in a predetermined block, quantizing means for quantizing the spatial frequency component data in accordance with one quantizing method from among a plurality of different quantizing methods, discriminating means for discriminating an image type by comparing each of the spatial frequency component data with a predetermined value, and selecting means for selecting one quantizing method from among said plurality of different quantizing methods in accordance with the discrimination made by said discriminating means.

A further aspect of the present invention provide an image compressing method comprising steps of inputting a plurality of spatial frequency component date in a predetermined block, discriminating an image type by comparing each of the spatial frequency component data with a predetermined value, and selecting one quantizing method from among a plurality of different quantizing method in accordance with the discrimination, quantizing the spatial frequency component data in accordance with the quantizing method selected from among the plurality of different quantizing methods.

A further aspect of the present invention provide an image processing apparatus comprising first read-out means for reading-out information, which is obtained by orthogonally transforming a multivalued image signal, from a high-frequency component to a low-frequency component in block units, second read-out means for reading-out the information, which has been obtained by the orthogonal transformation, from the low-frequency component to the high-frequency component in block units, and selecting means for selecting said first read-out means or said second read-out means in block units.

A further aspect of the present invention provides an image processing method comprising steps of first read-out step for reading-out information, which is obtained by orthogonally transforming a multivalued image signal, from a high-frequency component to a low-frequency component in block units, second read-out step for reading-out the information, which has been obtained by the orthogonal transformation, from the low-frequency component to the high-frequency component in block units, and repeating step for repeating said first and second step.

A further object of the present invention is to provide an image compressing apparatus in which image compression can be performed efficiently with high speed.

A further object of the present invention is to provide a multivalued image compressing apparatus for generally use.

A further object of the present invention is to improve hardware for variable-length coding.

A further object of the present invention is to provide an apparatus in which deterioration in image quality can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 9A and 9B are diagrams showing the relationship between input data from an image scanner and DCT coefficients;

FIGS. 10A and 10B are diagrams showing the relationship between artificially created input data and DCT coefficients;

FIGS. 11A and 11B are diagrams showing examples of Q tables;

FIGS. 13A, 13B, 13C and 13D are diagrams showing examples of Q tables according to the second embodiment;

FIGS. 15A and 15B are diagrams showing examples of Q tables according to the third embodiment;

DESCRIPTION OF THE PREFERRED EMBODIMENTS

Embodiments of the present invention will now be described with reference to the accompanying drawings.

Figure 5:
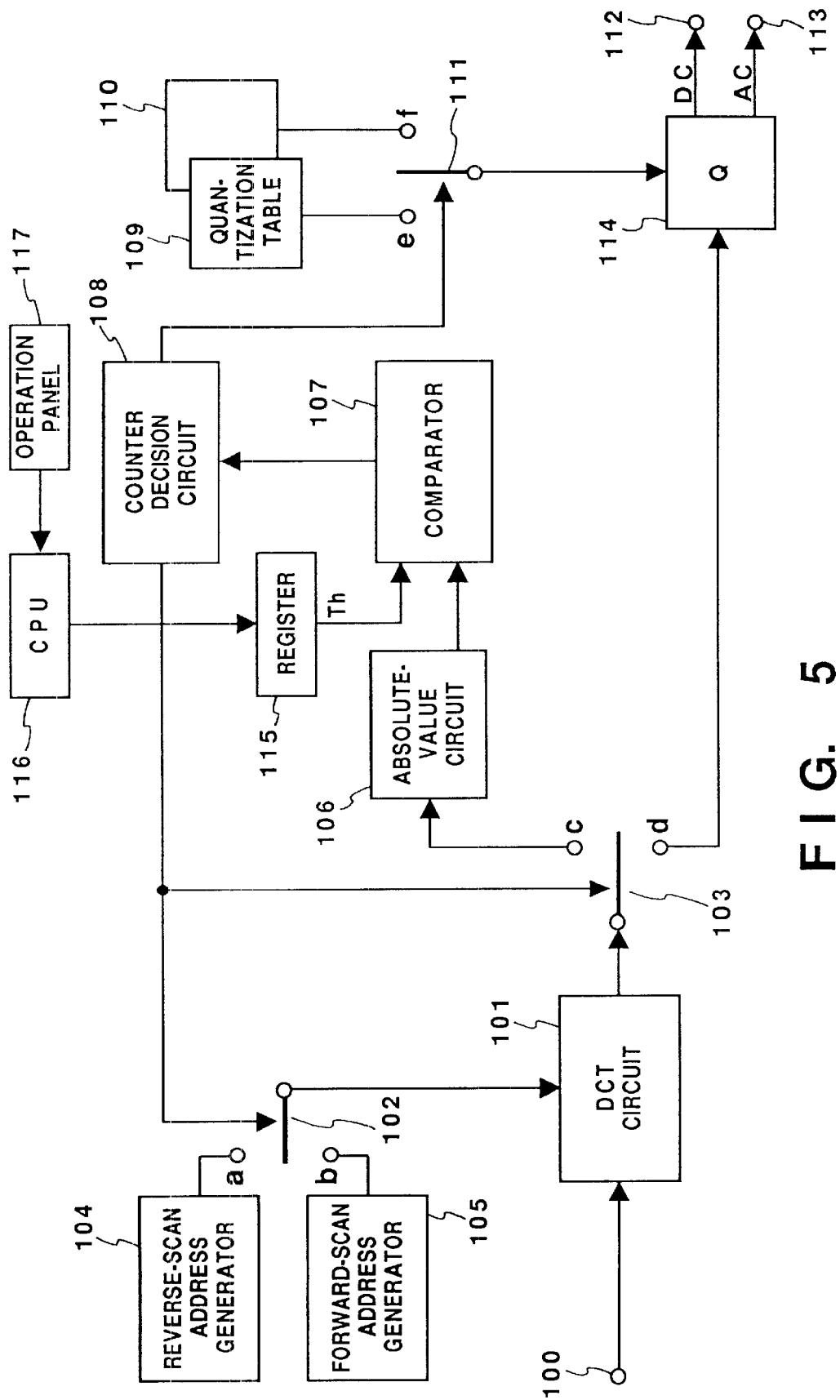
FIG. 5 is a block diagram showing the principal portion of a first embodiment of an image compressing apparatus according to the present invention.
Figure 6:
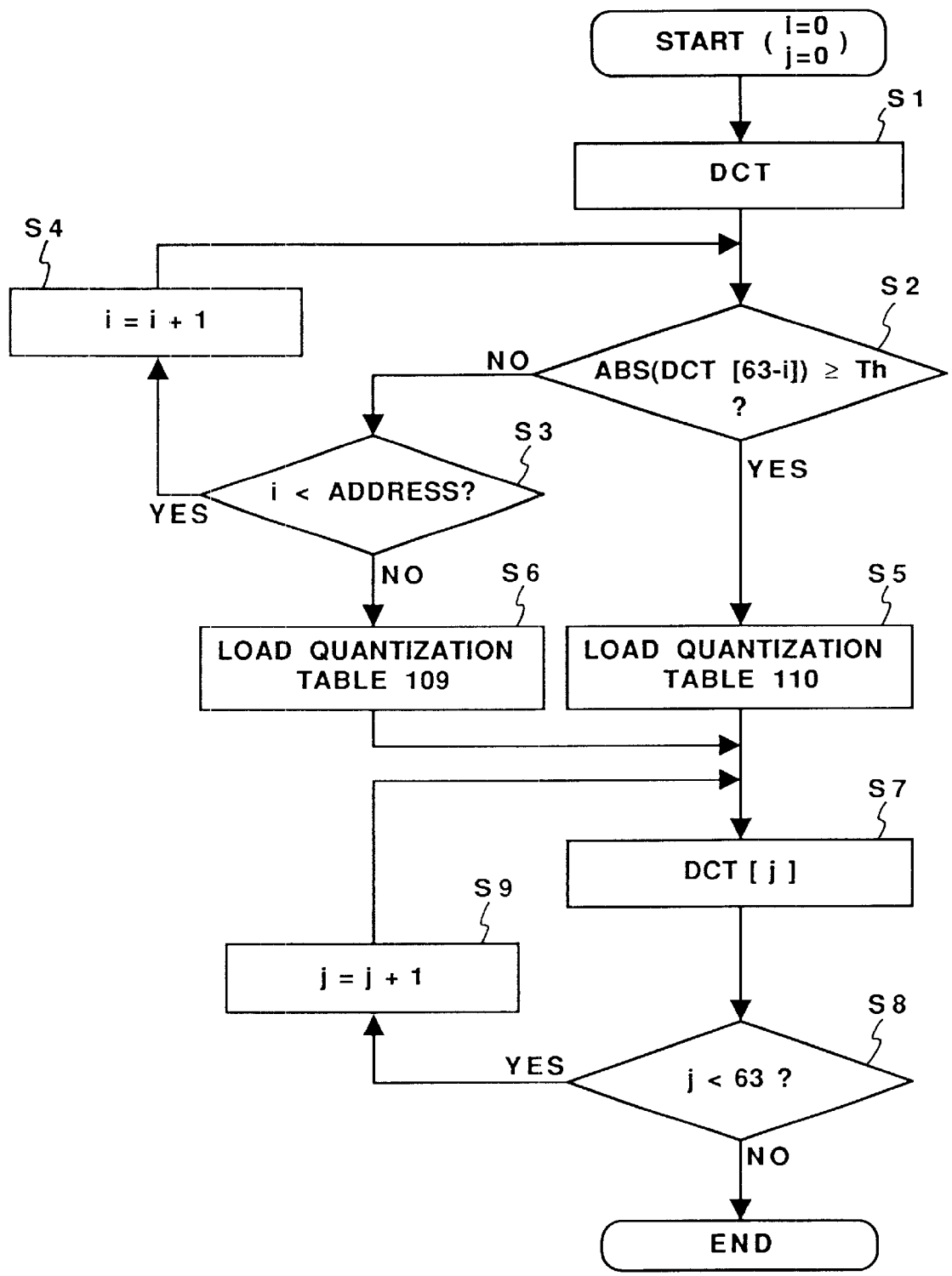
FIG. 6 is a flowchart for describing the main operating procedure according to the first embodiment.
Figure 7:
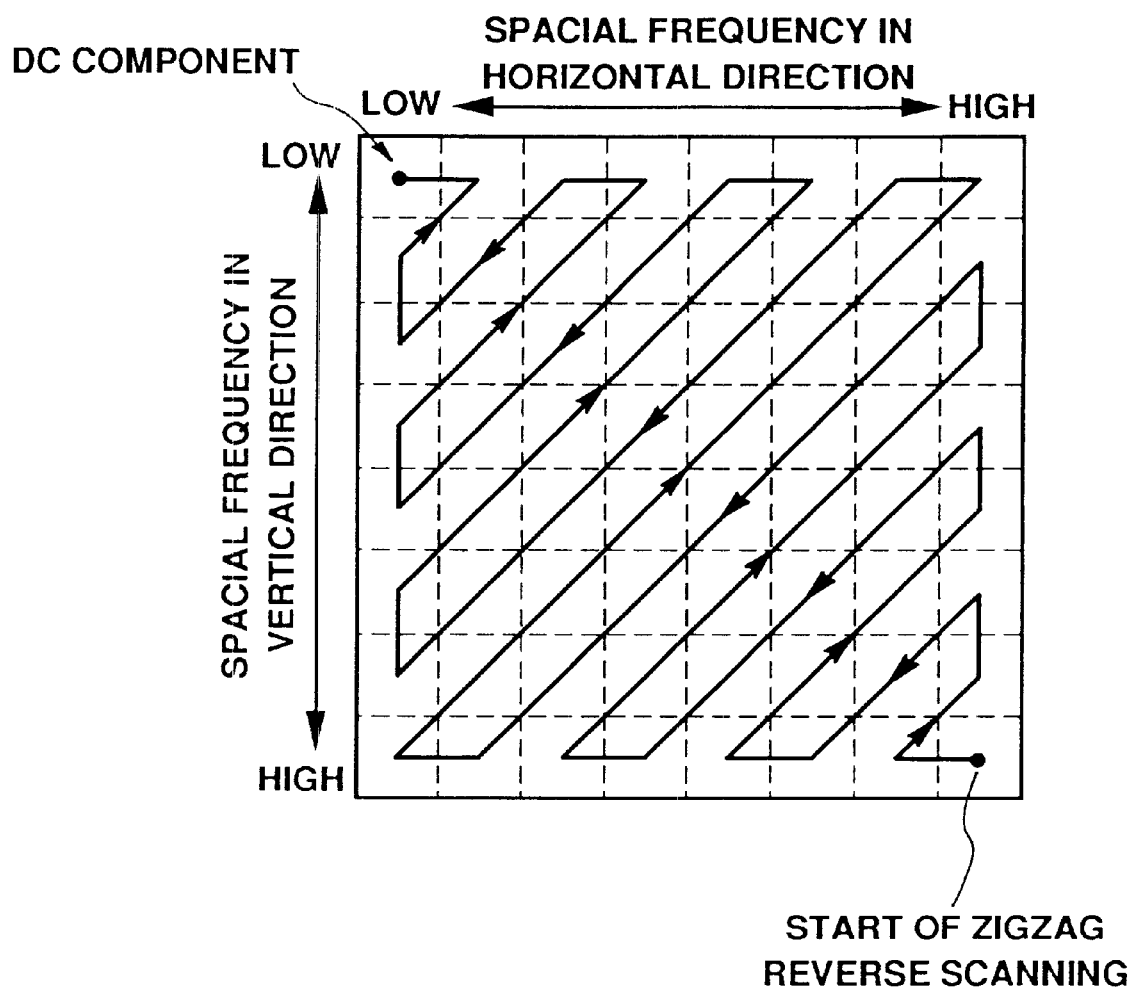
FIG. 7 is a diagram showing a reverse scanning sequence of DCT coefficients.
Figure 8:
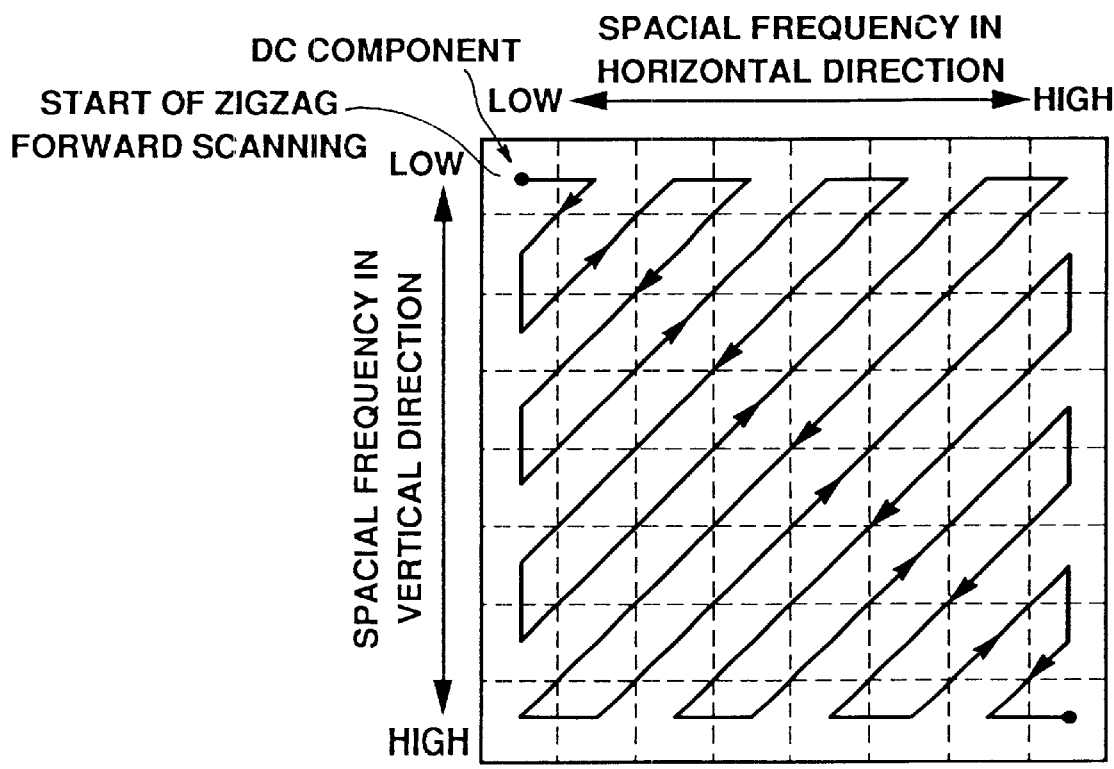
FIG. 8 is a diagram showing a forward scanning sequence of DCT coefficients.

FIG. 5 is a block diagram showing the principal portion of a first embodiment of an image compressing apparatus according to the present invention, FIG. 6 is a flowchart for describing the main operating procedure according to the first embodiment, FIG. 7 is a diagram showing a reverse scanning sequence of DCT coefficients, FIG. 8 is a diagram showing a forward scanning sequence of DCT coefficients, FIGS. 9A and 9B are diagrams showing the relationship between input data from an image scanner and DCT coefficients, and FIGS. 10A and 10B are diagrams showing the relationship between input data which is artificially created with a computer and DCT coefficients.

Shown in FIG. 5 are an input terminal 100, a DCT circuit 101, switches 102, 103, 111, a reverse-scan address generator 104, forward-scan address generator 105, a comparator 107, a counter decision circuit 108, quantization tables 109, 110, of which the quantizing characteristics are different each other, an output terminal 112 for the DC component, an output terminal 113 for AC components, and a Q unit 114.

The input terminal 100 inputs multi-level image data from image scanner or multi-level image data which is artificially created with a computer.

115 shows a register for storing a threshold values (Ths). 117 denotes a operation panel for selecting Th manually, and 116 designates a cpu for setting a Th selected by the operation panel 117 in the register 115.

The operation performed by this apparatus will now be described with reference to the flowchart of FIG. 6.

A multivalued image signal corresponding to an image inputted from the input terminal 100 is cut into blocks of 8×8 pixels by a block forming circuit, not shown, and is then sent to a DCT circuit 101, where each block is subjected to DCT at step S1. In the description of this embodiment, an 8×8 DCT is used as the orthogonal transformation. However, it goes without saying that another method of orthogonal transformation, such as the Hadamard Transform, and a block size other than 8×8 may be used.

The transformation coefficients resulting from DCT are rearranged one-dimensionally in zigzag form from coefficients of lower order to coefficients of higher order, as in the prior art shown in FIG. 8. The one dimensionally arrayed DCT coefficients are now defined in the form of an array referred to as "DCT[n] (n=0~63)". DCT[0] indicates the coefficient of a DC component, and DCT[1]~DCT[63] represent the coefficients of AC components. The smaller the value of n, the lower the order of the coefficient.

The switches 102 and 103 in FIG. 5 are connected to terminals a, c, respectively, by initialization at every 8×8 pixel block. As indicated by the arrow in FIG. 7, the reverse-scan address generator 104 provides addresses for scanning from the transformation coefficient of the highest order to the transformation coefficients of lower order. As indicated by the arrow in FIG. 8, the forward-scan address generator 105 provides addresses for scanning from the transformation coefficient of the lowest order to the transformation coefficients of higher order. More specifically, the array is such that the DC component becomes DCT[0] and the AC components become DCT[1], [2], . . . , DCT[63]. In other words, DCT[n] indicates the transformation coefficient of address n.

First, DCT[63−i] is loaded by the reverse-scan address generator 104, this is converted into an absolute value by the absolute-value circuit 106 {let this be represented by ABS (DCT[63−i])}, and the absolute value is delivered to the comparator 107. The latter compares ABS(DCT[63−i]) with a predetermined threshold value (Th) to determine whether AC power exists above the threshold value (step S2 in FIG. 6). If it is determined at step S2 that "ABS(DCT[63−i]) ≧Th" holds, then, at step S3, the counter decision circuit 108 determines whether i has attained a preset address. This address is set in advance as a value capable of taking on a high-frequency component only. For example, if DCT[45]–DCT[63] is assumed to hold, then address=19.

If i<address is found to hold at step S3, the processing i=i+1 is executed by the counter decision circuit 108, the next DCT coefficient is scanned and the same operation is repeated. The method of setting the threshold value Th and the address value will be described later.

The counter 108 implements the changeover of the switches 102 and 103. When the condition of step S2, namely "ABS(DCT[63−i])≧Th", holds, and when "i≧address" holds, the terminals of the switches 102, 103 are changed over to b, d, respectively. When a "YES" decision is rendered at step S2, the quantization table 110 for image data artificially created with a computer is selected at step S5. When a "NO" decision is rendered at step S3, the quantization table 109 for half-tone image date is selected at step S6. In actuality, the quantization table 109 is selected at the time of initialization (by default). In other words, switch 111 is connected to terminal e at all times. In terms of design, an arrangement may be adopted in which a changeover is made and the quantization table 109 loaded in dependence upon the output (a signal indicating that the decision at step S2 is "YES") of the comparator 107.

Once one of the quantization tables has been selected, first quantization of the DC component DCT[0], and then quantization of the AC components DCT[1], DCT[2], . . . , DCT[63], is performed at step S6 in FIG. 6 by the forward-scan address generator 105 and the Q unit 114 in accordance with the forward scanning arrow shown in FIG. 8. In FIG. 5, the DC component is outputted to output terminal 112 and the AC components are outputted to output terminal 113. After quantization, it is permissible to employ the related-art method described earlier.

Depending upon the decision at step S8 as to whether j<63 holds, it is determined whether the coding of one block has ended. If the coding of one block is as yet unfinished, the processing j=j+1 is performed at step S9 and quantization is repeated. Once the terminals b, d have been selected by the switches 102, 103 in one block, this state is maintained until the coding of the block ends.

Though this embodiment is simply constructed and controlled as described above, setting of the threshold Th, the addresses and the quantization tables 109, 110 is necessary to be performed in advance.

Image data obtained by sampling a natural image (an image of half tones) by means of an image scanner is illustrated in FIG. 9A. This image data is composed of eight bits and is the result of putting an edge portion in the form of an 8×8 block.

Even a steep edge portion has points weakened by the MTF of an image scanner. In a natural image, there are points where a steep edge cannot readily be obtained by the MTF of a photograph or the like.

FIG. 9B illustrates transformation coefficients obtained by subjecting the image of FIG. 9A to DCT. These coefficients take on values of −1024 to +1023 and are composed of 11 bits. In order to make the dynamic range identical with that of the AC components, the DC component is subjected to DCT after 127 is subtracted from each pixel of FIG. 9A. Thus, in the edge portion of a natural image, the DCT transformation coefficients produce large values in the low-frequency region, and the AC power becomes small even if large values are produced in the high-frequency region.

FIG. 10A illustrates a signal created artificially in a computer. This signal is composed of eight bits, just as in FIG. 9A. FIG. 10B illustrates the transformation coefficients obtained by subjecting this signal to DCT. Since the overall AC power differs from that of FIG. 9A, an unqualified comparison cannot be made, although fairly large values occur not only in the low region but also in the high region. The values shown in FIG. 10A are only one example. In an artificially created edge portion, a pattern can be created in which the AC power is larger in the high-frequency region than in the low-frequency region. That is, AC power that cannot be obtained in information indicative of an image inputted by an image scanner or the like is generated in high-frequency components. When this is considered in terms of a system, weakening due to the MTF characteristic of a device such as an image input unit that is usually connected is found beforehand based upon experimentation and experience, and then the aforementioned addresses and threshold value Th are determined. For example, now the addresses are set to 36 (address=36) from DCT[28] to DCT[63], and Th is set to 50 (Th=50). Though an artificially created edge portion has components here and there where the absolute values of the DCT coefficients exceed 50, it is assumed that an edge portion has not occurred in the image read in by the image scanner. That is, if there is even one component greater than a certain threshold value in the set high-frequency components, this is regarded as being an artificially created edge portion, line drawing, etc. The arrangement is such that a flat portion, which is not an edge portion, will not be extracted, even in the case of an artificially created image.

FIGS. 11A and 11B are diagrams showing examples of the above-described quantization tables 109, 110, respectively. FIG. 11A illustrates a table of brightness components Y treated as the MPEG standardization table described in the discussion of the prior art. This illustrates step widths, on the basis of which linear quantization is performed. Of course, the larger the values, the coarser the quantization performed.

FIG. 11B illustrates an example of the quantization table 110. In accordance with this quantization table, the high- and low-frequency regions have substantially the same values. That is, let $S_{low}$ and $S_{high}$ represent the step widths of the components in the low- and high-frequency regions, respectively, of a block in which an artificially created edge portion has not been extracted, and let $S'_{low}$ and $S'_{high}$ represent the step widths of the components in the low- and high-frequency regions, respectively, of a block determined to be an artificially created edge portion. In such case, the setting made is such that the following will hold: $S_{low}/S_{high} < S'_{low}/S'_{high} \leq 1$. In other words, the slope of the f characteristic, which is indicative of the low- to the high-frequency region, is made smoother by making a transition from the quantization table 109 to the quantization table 110.

Thus, as set forth above, whether an inputted image is an artificially created edge portion is determined every block by a simple technique, after which the quantization conditions are changed over.

In accordance with the first embodiment, as described above, the edge portion of an image such as an artificially created line drawing, e.g., a line drawing created by a computer, or of a font, etc., is detected through a simple arrangement, and appropriate quantization is executed, whereby an output image can be formed in excellent fashion regardless of the input source.

<Second Embodiment>

Figure 12:
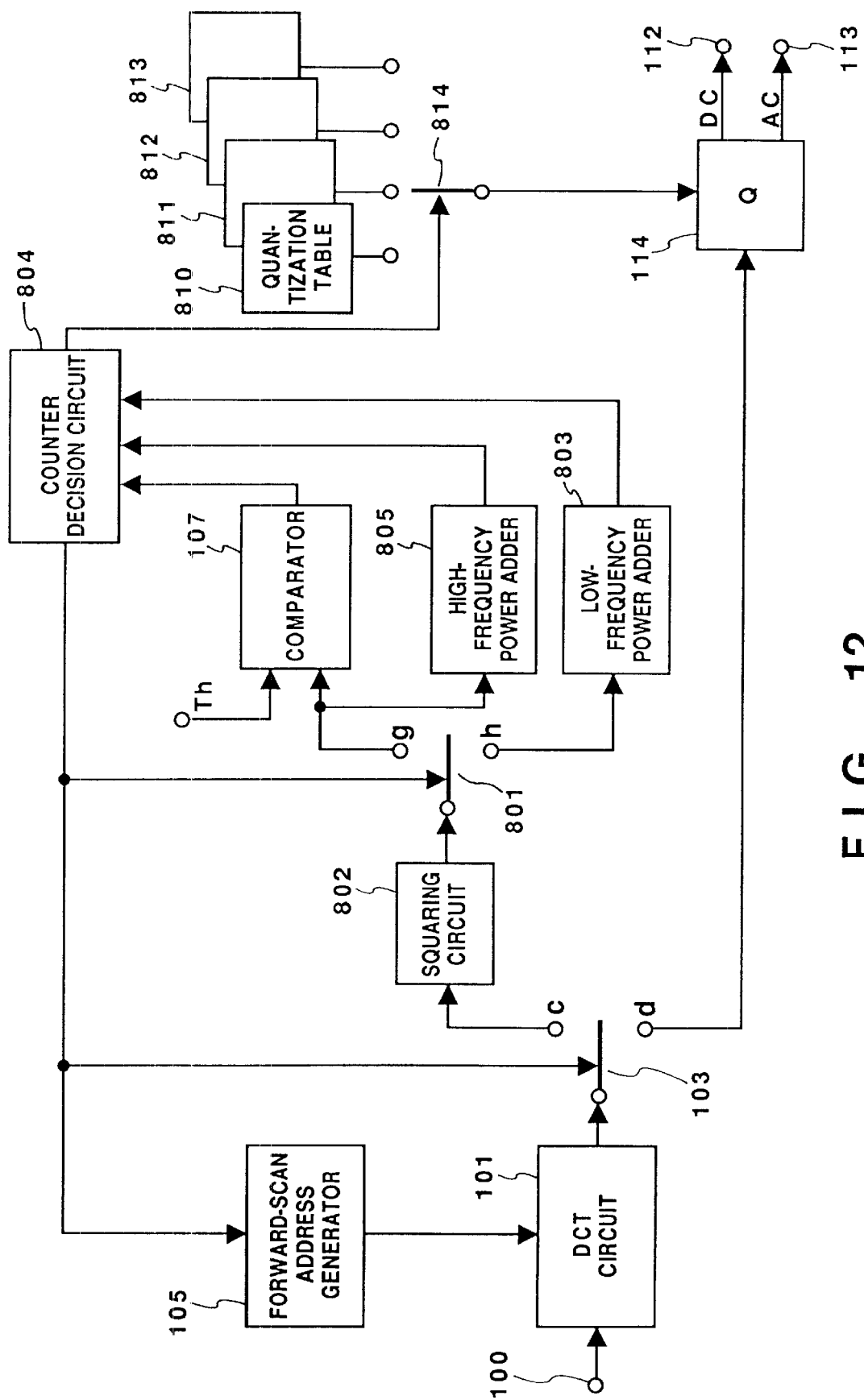
FIG. 12 is a block diagram showing the principal portion of a second embodiment of an image compressing apparatus according to the present invention.

FIG. 12 is a block diagram showing the principal portions of a second embodiment of an image compressing apparatus according to the present invention. FIGS. 13A, 13B, 13C and 13D are diagrams showing examples of quantization tables according to a second embodiment.

This embodiment makes it possible to realize changeover of a greater number of quantization tables in comparison with the first embodiment shown in FIG. 5. Portions identical with those shown in FIG. 5 are designated by like reference characters. The apparatus of this embodiment differs from that of the first embodiment in the following components: switches 801, 814, a squaring circuit 802, a low-frequency power adder 803, a counter decision circuit 804, a high-frequency power adder 805, and quantization tables 810, 811, 812 and 813.

In FIG. 12, the transformation coefficients that have undergone DCT are scanned in accordance with the forward scanning direction (the direction of the arrow in FIG. 8, though a DC component is not used here). First, the AC transformation coefficient DCT[1] of the lowermost order is read out. The switches 103 and 801 are connected to c, h, respectively, by initialization. DCT[1] is squared by the squaring circuit 802, and the result is delivered to the low-frequency power adder 803. The latter serves to cumulatively add the squares of the low-frequency transformation coefficients. For example, in a case where there are 27 components DCT[1]~DCT[27] in the low-frequency region and 36 components DCT[28]~DCT[63] in the high-frequency region, the counter decision circuit 804 counts up to the 27 components and changes over the switch 801 from terminal h to terminal g. The high-frequency power adder 805 obtains the value of $$\sum_{j=28}^{63} (DCT[j])^2$$

and holds this value. In the high-frequency components, a threshold value Th set in advance by the comparator 107, just as in the first embodiment. In this embodiment, the transformation coefficients are squares and not absolute values, and therefore it is necessary that the threshold value also be a squared value. At the moment scanning from DCT[1] to DCT[63] ends, the counter decision circuit 804 receives signals from the comparator 107, the high-frequency power adder 805 and the low-frequency power adder 803, and sends a signal to the switch 814 to change over the Q tables 810, 811, 812 and 813.

Mean high-frequency power $P_{high}$ per component and means low-frequency power $P_{low}$ per component are obtained by the counter decision circuit 804. For example, in a case where the low-frequency region is DCT[1] to DCT[27] and the high-frequency region is DCT[28] to DCT[63], as described above, we have $$P_{low} = 1/27 \sum_{j=1}^{27} (DCT[j])^2$$

$$P_{high} = 1/36 \sum_{j=28}^{63} (DCT[j])^2$$

The counter decision circuit 804 obtains the power ratio ($P_{high}/P_{low}$) and changes over the quantization tables, in the manner shown below, by way of example, in accordance with the power ratio and the result of the comparison performed by comparator 107.

The changeover is made to quantization table 110 when Th is exceeded and $P_{high}/P_{low} \geq 0.8$ holds; to quantization table 111 when Th is exceeded and $P_{high}/P_{low} < 0.8$ holds; to quantization table 112 when Th is not exceeded and $P_{high}/P_{low} \geq 0.8$ holds; and to 10 quantization table 113 when Th is not exceeded and $P_{high}/P_{low} < 0.8$ holds. FIGS. 13A, 13B, 13C and 13D are illustrated as one example.

More specifically, when the value of the power ratio $P_{high}/P_{low}$ is large, the quantization table is selected that will make the ratio $S_{low}/S_{high}$ of the step widths of the quantization tables in this embodiment approach 1. The above-described selection is carried out by the switch 814, and the command to perform this selection is received from the counter decision circuit 804.

When the changeover of the quantization tables ends, the forward-scan address generator 105 returns to the beginning address again and then reads DCT[0]~DCT[63] from the DC component. The switch 103 is connected from terminal c to terminal d, quantization is performed by the Q unit 114, the DC component is outputted to the terminal 112, and the AC components are outputted to the terminal 113.

This embodiment has been described based upon FIG. 12. In a case where the quantization steps of the DC component are identical regardless of the quantization table, coding should be carried out by pipeline processing while the quantization-table selection operation is in progress in order to curtail time.

In other words, the quantization-table selection operation and the coding operation can be performed simultaneously for different blocks respectively.

Though this embodiment has been described using four types of quantization tables, the number of quantization tables used may be more or less than four.

<Third Embodiment>

In the second embodiment described above, the sums of the squares in the high- and low-frequency regions are compared to the sum total of the power. However, in order to achieve a simplification, it is permissible to compare the sums of the absolute values of each of the high- and low-frequency regions.

Figure 14:
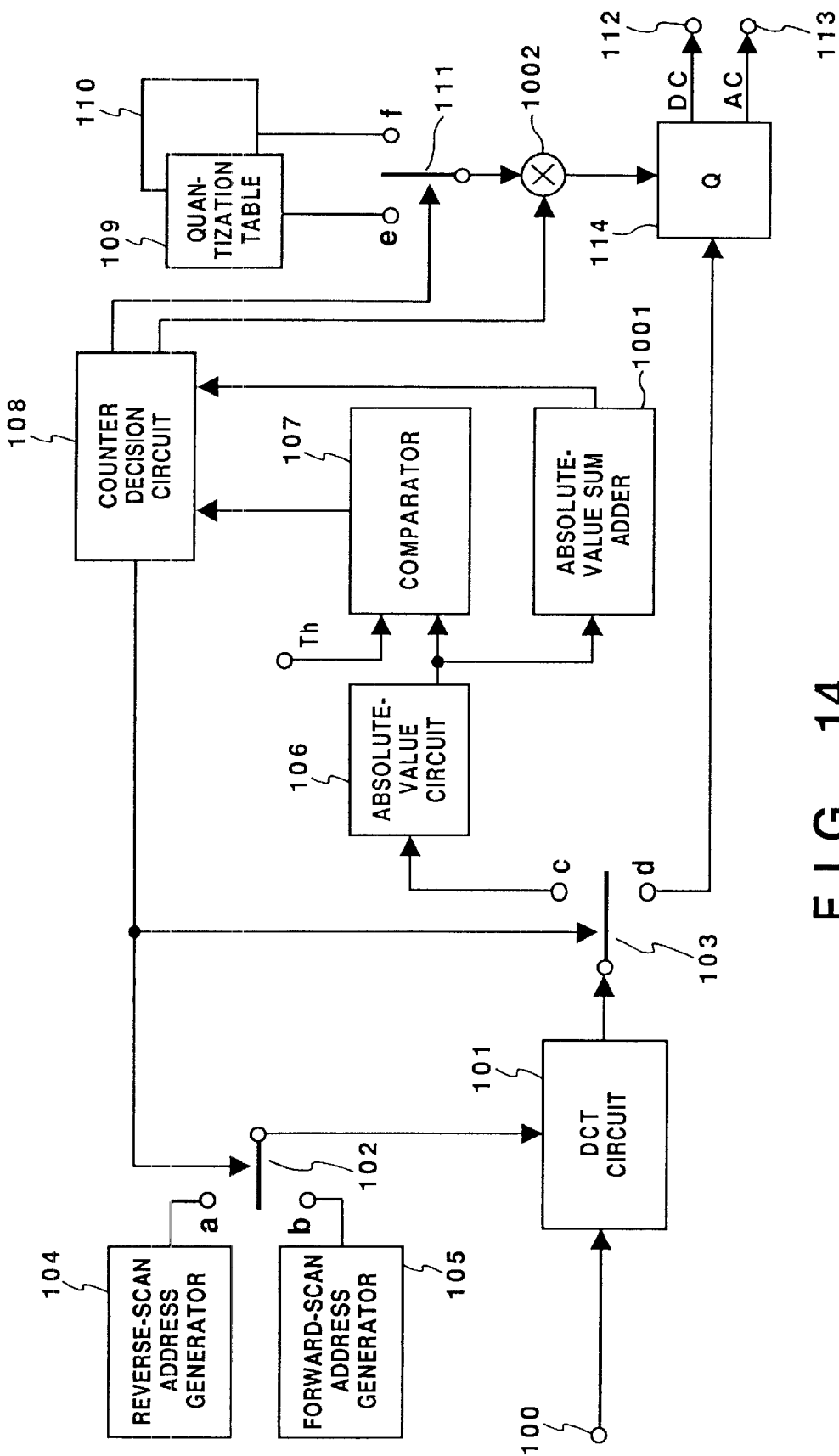
FIG. 14 is a block diagram showing the principal portion of a third embodiment of an image compressing apparatus according to the present invention.

FIG. 14 is a block diagram showing the principal portions of a third embodiment of the image compressing apparatus according to this invention. Portions identical with those of the first embodiment will be designated by like reference characters and only the aspects that differ from the first embodiment will be described.

In FIG. 14 numeral 1001 denotes an absolute-value sum adder for calculating the sum of absolute values of inputted high-frequency transformation coefficients. The adder 1001 not only compares the absolute values of high-frequency components with the threshold value described in the first embodiment but also investigates the extent of the sub of the absolute values of the high-frequency region. More specifically, the quantization conditions are changed over between one condition when only one component makes an appearance in the high-frequency region and another condition in a case where the values are large overall.

As described in connection with the first embodiment, the changeover of the quantization tables 109, 110 is performed by switch 111 upon determining whether there is an artificial edge portion, which is itself determined by whether there is an absolute value among the absolute values of the high-frequency transformation coefficients that exceeds Th.

FIG. 15A is a diagram showing examples of quantization tables according to the third embodiment.

The table of FIG. 15A is selected in case of a block judged to be an image inputted by an image scanner or the like, and the table of FIG. 15B is selected in case of a block judged to be an artificial edge portion. In FIGS. 15A and 15B, only AC components are illustrated in the example of quantization table 109, and the DC component, which is the example of quantization table 110, should be fixed separately and held. A so-called scaling factor (S factor), which multiplies each coefficient of the quantization table 110, is set in a multiplier 1002, based upon the output of the absolute-value sum adder 1001, only in the case where the quantization table 110 has been selected. More specifically, when the sum of the absolute values in the high-frequency region is large, the S factor is set to be large. When the sum of the absolute values in the high-frequency region is small, it is judged that only a certain component has emerged to exceed the threshold value, and the S factor is set to be small. In case of an artificial edge portion, the importance of high-frequency components is great, unlike the case of an edge portion in a natural image, and therefore all components of the high-frequency region are exploited as much as possible. However, when the S factor is set small every time, the image obtained is good but the amount of coding increases. Consequently, the above-described processing is effective.

<Fourth Embodiment>

Figure 16:
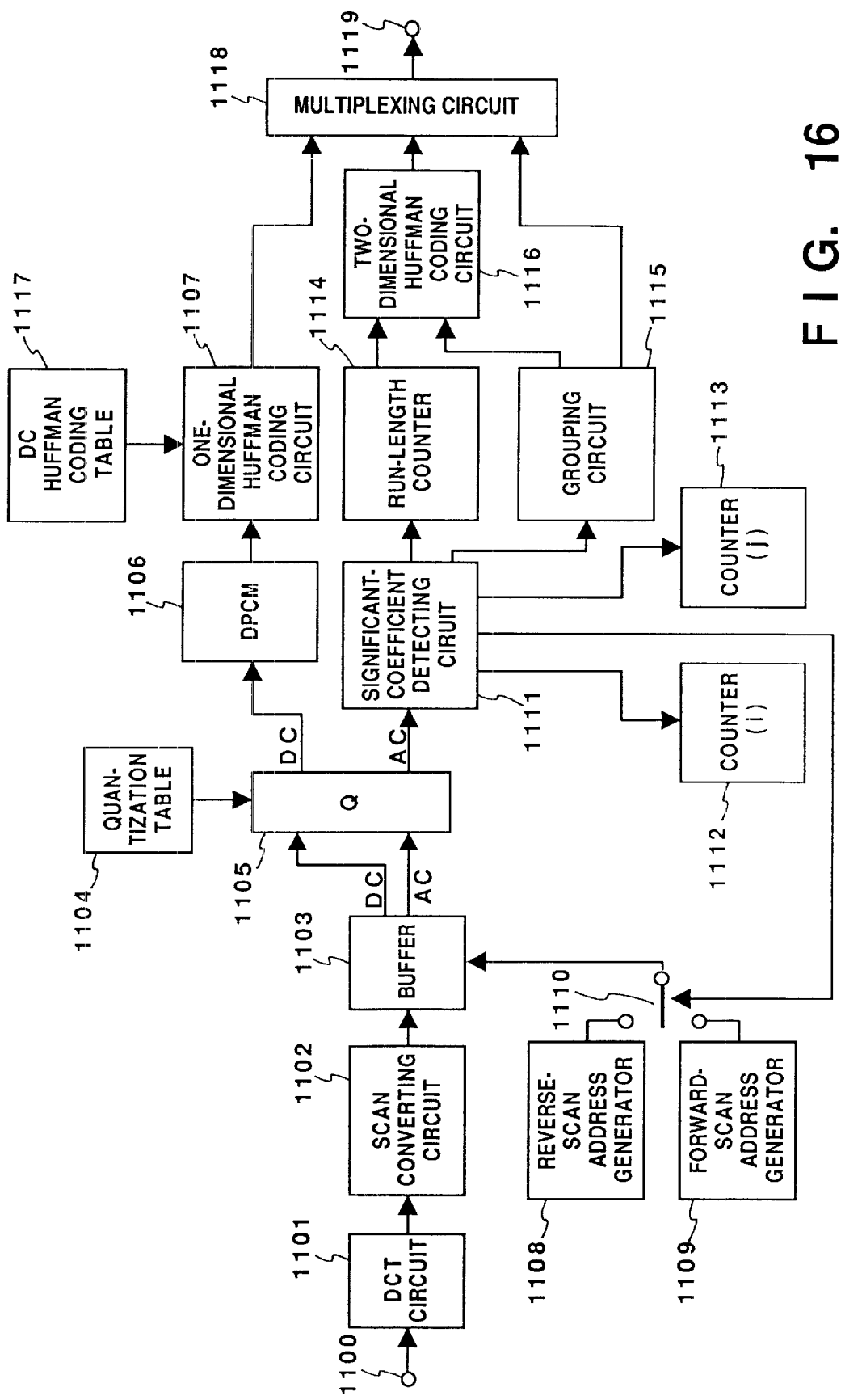
FIG. 16 is a block diagram showing the construction of a fourth embodiment of an image compressing apparatus according to the present invention.
Figure 17A:
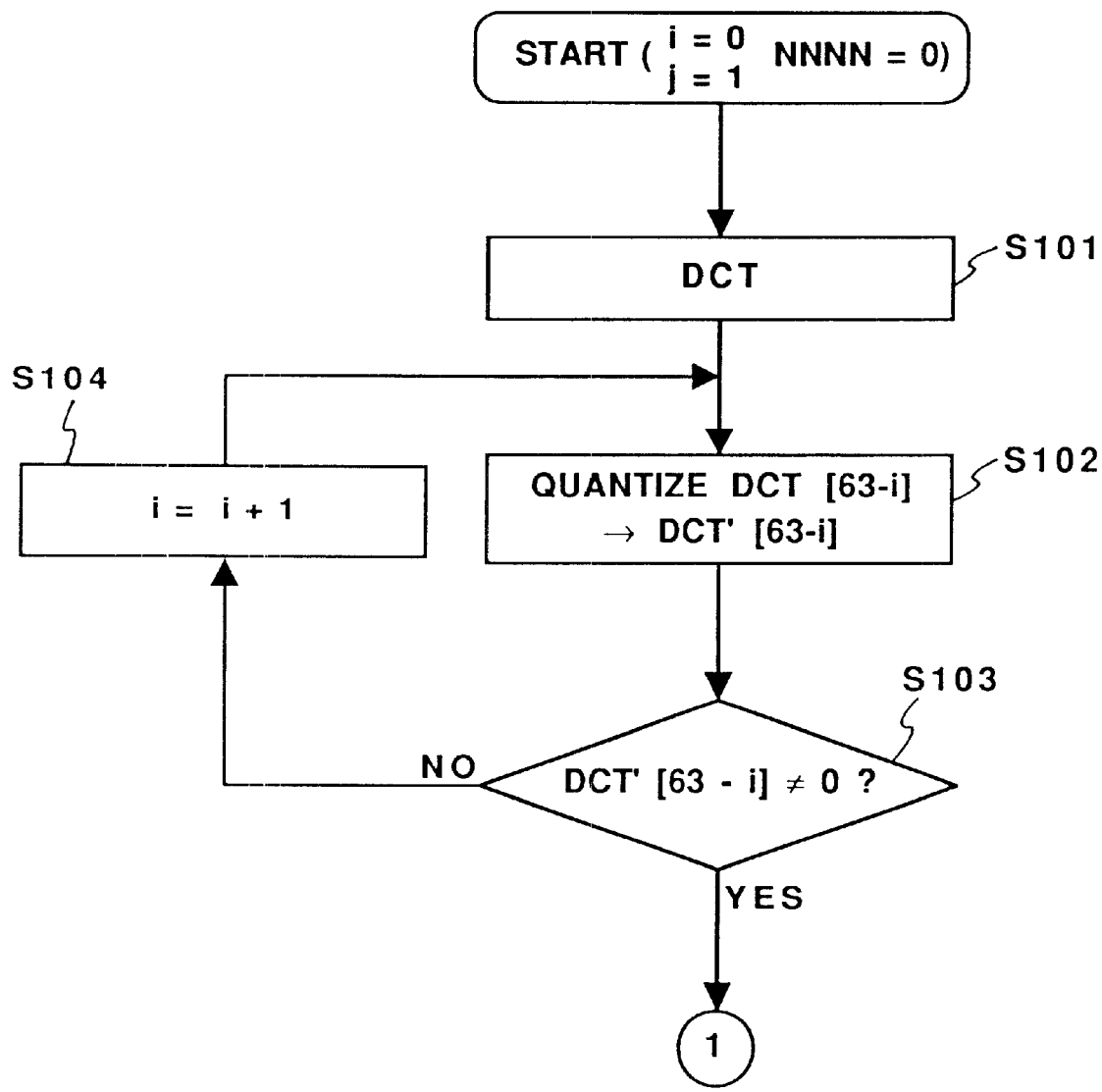
FIG. 17A is a flowchart for describing a principal operating procedure according to a fourth embodiment.
Figure 17B:
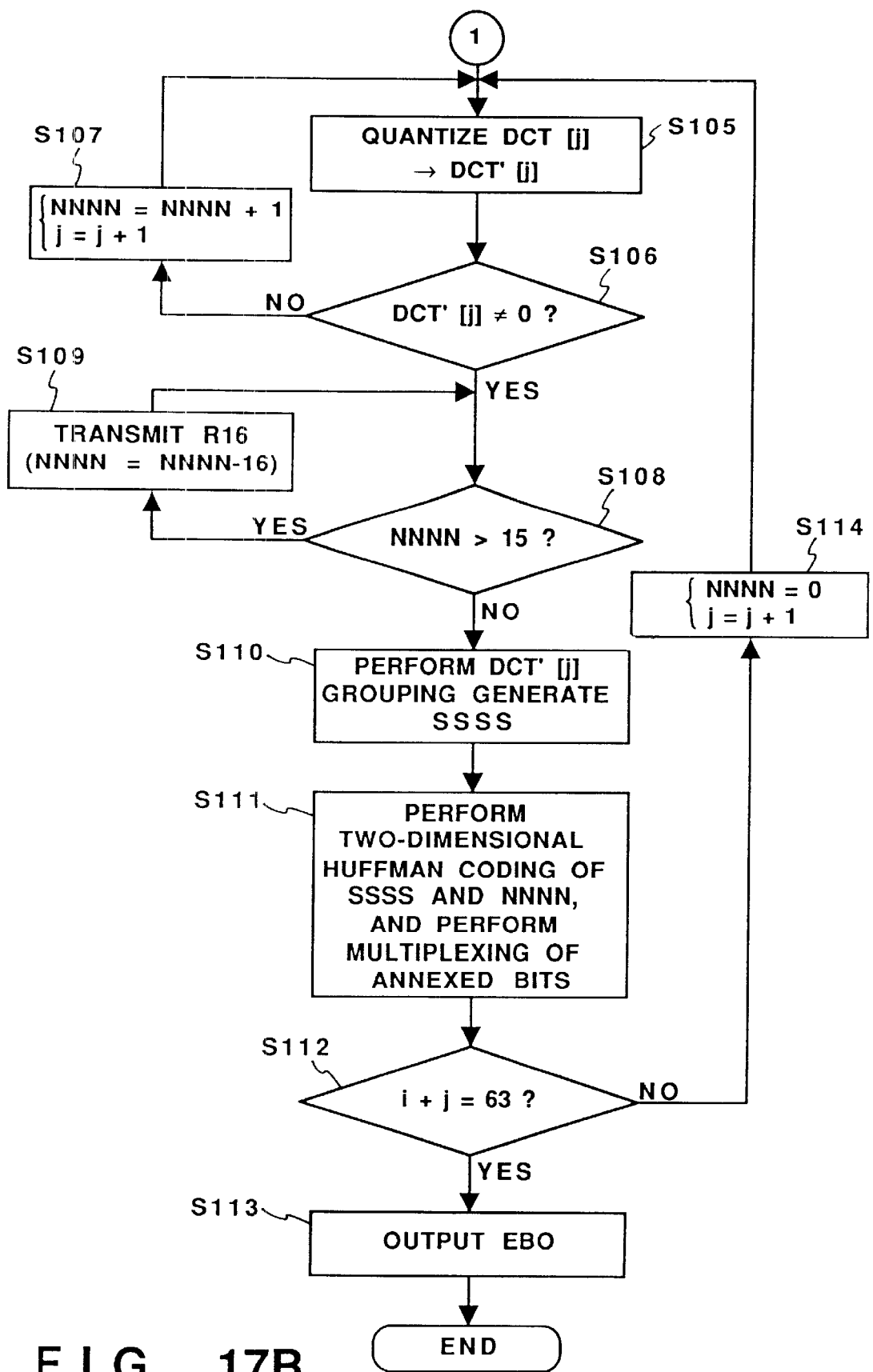
FIG. 17B is a flowchart for describing the principal operating procedure according to the fourth embodiment.

FIG. 16 is a block diagram showing the construction of a fourth embodiment of an image compressing apparatus according to the present invention, and FIGS. 17A, 17B are flowcharts for describing a principal operating procedure according to the fourth embodiment.

Shown in FIG. 16 are an input terminal 1100 such as input terminal 100 of FIG. 5 for inputting a multivalued image signal, a DCT circuit 1101, a scan converting circuit 1102, a buffer 1103, a Q table 1104, a Q unit 1105, a DPCM 1106, a one-dimensional Huffman coding circuit 1107, a reverse-scan address generator 1109, a forward-scan address generator 1110, a significant-coefficient detecting circuit 1111, counters 1112, 1113, a run-length counter 1114, grouping circuit 1115, a two-dimensional Huffman coding circuit 1116, a DC Huffman table 1117, a multiplexer circuit 1118, and an output terminal 1119.

The operation of the apparatus constructed as set forth above will now be described with reference to FIGS. 17A and 17B.

A multivalued image signal inputted from the input terminal 1100 is cut into a block of 8×8 pixels by a block forming circuit(not shown), which is an earlier stage, and is then sent to the DCT circuit 1101, where it is subjected to DCT at step S101 in FIG. 17A. In the description of this embodiment, an 8×8 DCT is used as the orthogonal transformation. However, it goes without saying that another method of orthogonal transformation and a block size other than 8×8 may be used.

The arrayed DCT coefficients are stored in the buffer 1103 temporarily. The DC component (DCT[0]) is linearly quantized in the Q unit 1105 in accordance with quantization step information provided by the Q table 1104, as in the example of the prior art, the differential between this DC coefficient and the DC component of the preceding block is obtained by the DPCM 1106, and a code is generated by the one-dimensional Huffman coding circuit 1107. A characterizing feature of this embodiment is the operating procedure for coding the AC components. The reverse-scan address generator 1108 and the forward-scan address generator 1109 both transmit addresses for reading data from the buffer 1103. Reading of data from the buffer 1103 in the reverse direction (reverse scanning by reading from the larger numerical values of n in DCT[n]) is carried out in accordance with the address from the reverse-scan address generator 1108, and reading of data from the buffer 1103 in the forward direction (forward scanning by reading from the smaller numerical values of n in DCT[n]) is carried out in accordance with the address from the forward-scan address generator 1109.

As for the reading of AC components within a block, reverse scanning is selected by switch 1110 in advance.

Next, at step S102, the read DCT coefficient (DCT[63−i], where "0" is substituted for "i" by initialization) is linearly quantized in the Q unit 1105 in the same manner as the DC component. The DCT coefficient following quantization is generally defined as "DCT'[n]'". It is determined at step S103 whether DCT'[63−i] generated at step S102 is "0" (by the significant-coefficient detecting circuit 1111). If it is found that DCT'[63−i]=0 holds, the counter i indicated at 1112 is incremented (step S104) and, at the same time, a signal for. selecting reverse scanning again is sent to switch 1110. Owing to reverse scanning, only one component of a DCT coefficient which is one number earlier (one order lower) in the array within the buffer is read out anew, and an operation similar to that described above is repeated until the relation DCT'[63−i]≠0 is established. In other words, counting is performed from the quantized DCT coefficient (DCT'[63]) of the highest order within the block and the number of consecutive "0"s up to the address at which a significant coefficient is generated is counted by the counter 1112.

When it is determined at step S103 that DCT'[63−i]≠0 holds, the significant-coefficient detecting circuit 1111 sends the switch 1110 a signal which now selects forward-scan read-out.

In forward-scan read-out, the DCT coefficient having the youngest number in the array within buffer 1103 is read out and quantized at step S105. At step S105, the initialization of j is "1", and therefore DCT[0] is the DC component and the lowest order of the AC components becomes DCT[1]. First, DCT[1] is initialized and DCT'[1] is produced.

Next, at step S106, the significant-coefficient detecting circuit 1111 determines whether the quantized DCT'[j] is "0". If DCT'[j]=0 is found to hold at step S106, the counter 1113 is incremented and, at the same time, so is the counted value NNNN in the run-length counter 1114 (step S107), just as in the prior art. If DCT'[j]≠0 is found to hold at step S106, it is determined at step S108 whether the number of NNNN's accumulated thus far is greater than 15. If 15 is found to be exceeded, then "R16", described above in the discussion of the prior art, is transmitted and 16 is subtracted from the value of NNNN at step S109. If the number of NNNN's is equal to or less than 15, just as in the related art, then the grouping circuit 1115 groups the generated coefficients DCT'[j] other than "0" and generates SSSS at step S110. A code is generated by two-dimensional Huffman coding (by the two-dimensional Huffman coding circuit 1116) of the group number SSSS and "0" run length NNNN, and annexed bits are multiplexed at step S111. Then, at step S112, the values in the counters 1112 and 1113 are added and it is determined whether the sum is "63". If i+j=63 is found to hold, then EOB (end of block) is outputted at step S113 and the coding of one block ends. If i+j<63 is found to hold, the counter 1113 is incremented and, at the same time, the value in the run-length counter NNNN is reset (substituted by "0") at step S114 and processing is repeated starting from step 105.

By virtue of the arrangement described above, coding can be performed smoothly within a predetermined period of time every block regardless of the kind of code generated. In addition, the circuitry is inexpensive and simple and can be realized with ease.

<Fifth Embodiment>

Figure 18:
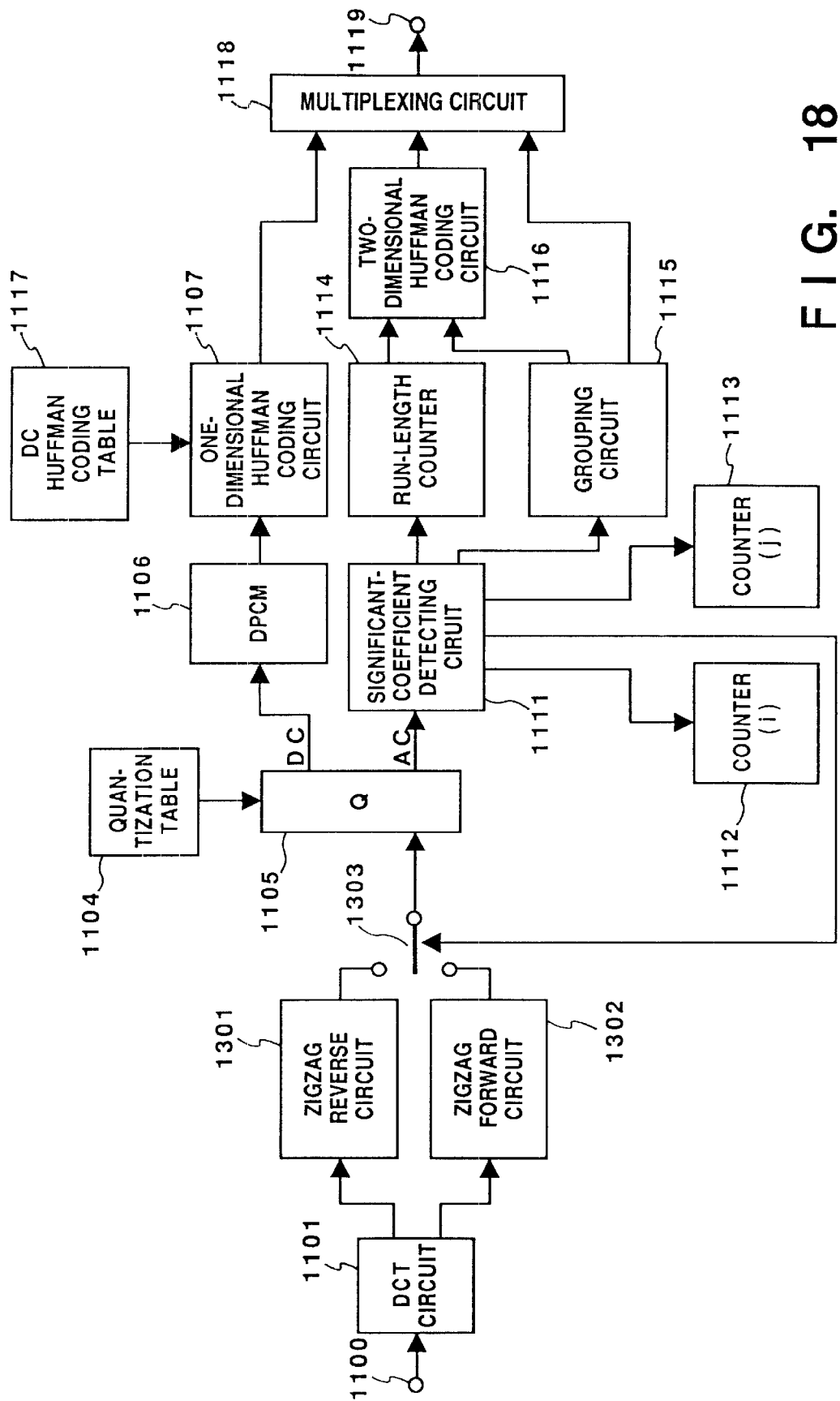
FIG. 18 is a block diagram showing the construction of a fifth embodiment of an image compressing apparatus according to the present invention.

FIG. 18 is a block diagram showing the construction of a fifth embodiment of an image compressing apparatus according to the present invention. The description of the scanning sequence of DCT coefficients in reverse scanning will be described with reference to FIG. 7, and the description of the scanning sequence of DCT coefficients in forward scanning will be described with reference to FIG. 8. The image compressing apparatus shown in FIG. 18 differs somewhat from the arrangement shown in FIG. 16. Blocks identical with those in FIG. 16 are designated by like reference characters.

In this embodiment, means for performing zigzag scanning and rearranging in one dimension after application of DCT, and then storing the coefficients in a buffer, as in the embodiment of FIG. 16, are not provided. Instead, means are provided for changing over the read-out direction of the DCT coefficients after DCT has been carried out by the DCT circuit 1101.

In FIG. 18, numerals 1301, 1302 denote zigzag reverse scanning and zigzag forward scanning circuits, respectively, for reading out DCT coefficients. The scanning circuit 1301 performs read-out by zigzag scanning from the reverse direction (shown in FIG. 7), and the scanning circuit 1302 performs read-out by zigzag scanning from the forward direction (shown in FIG. 8). Numeral 1303 denotes a switch for changing over the scanning circuits 1301, 1302. Zigzag reverse scanning is selected by an initial setting. As in the manner of the fourth embodiment described above, whether there are significant coefficients other than "0" is detected after quantization, and zigzag reverse scanning is selected is selected until a significant coefficient is generated. When a significant coefficient has been generated, zigzag forward scanning is selected by the switch 1303. Accordingly, first the leading DC component (DCT[0] in the fourth embodiment described above) shown in FIG. 8 is read in, quantization is performed and then DPCM and one-dimensional Huffman coding are applied. Next, quantization and coding are successively repeated from the lower order components of the AC components to the component at which a significant coefficient is finally generated.

In this embodiment also, the construction of the counters 1112 and 1113 is similar to that in the fourth embodiment. Since the DC component also is read out in the same manner as the AC components, initialization of the counter 1113 is required to be j=0. However, at the moment the relation i+j=63 is established, the coding of one block can be ended.

A more specific example will now be described.

Figure 19A:
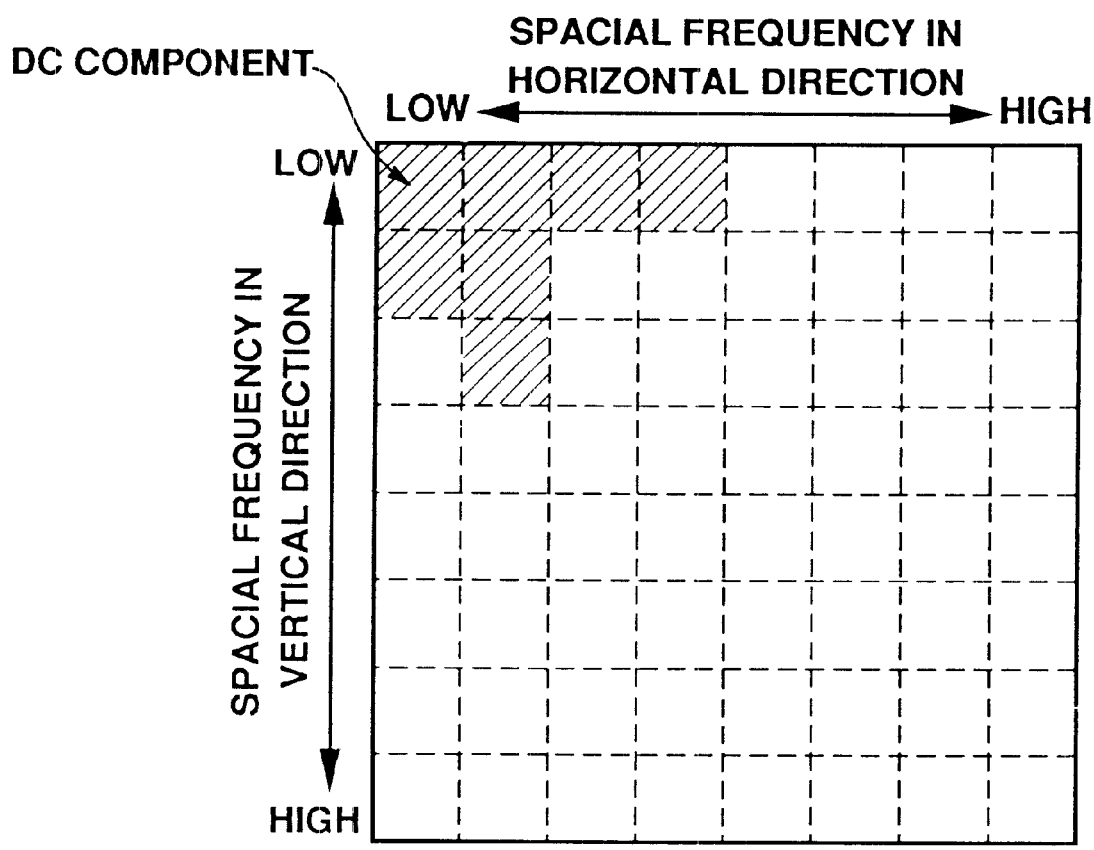
FIG. 19A is a diagram for describing the manner in which coefficients occur within a block after DCT has been applied.
Figure 19B:
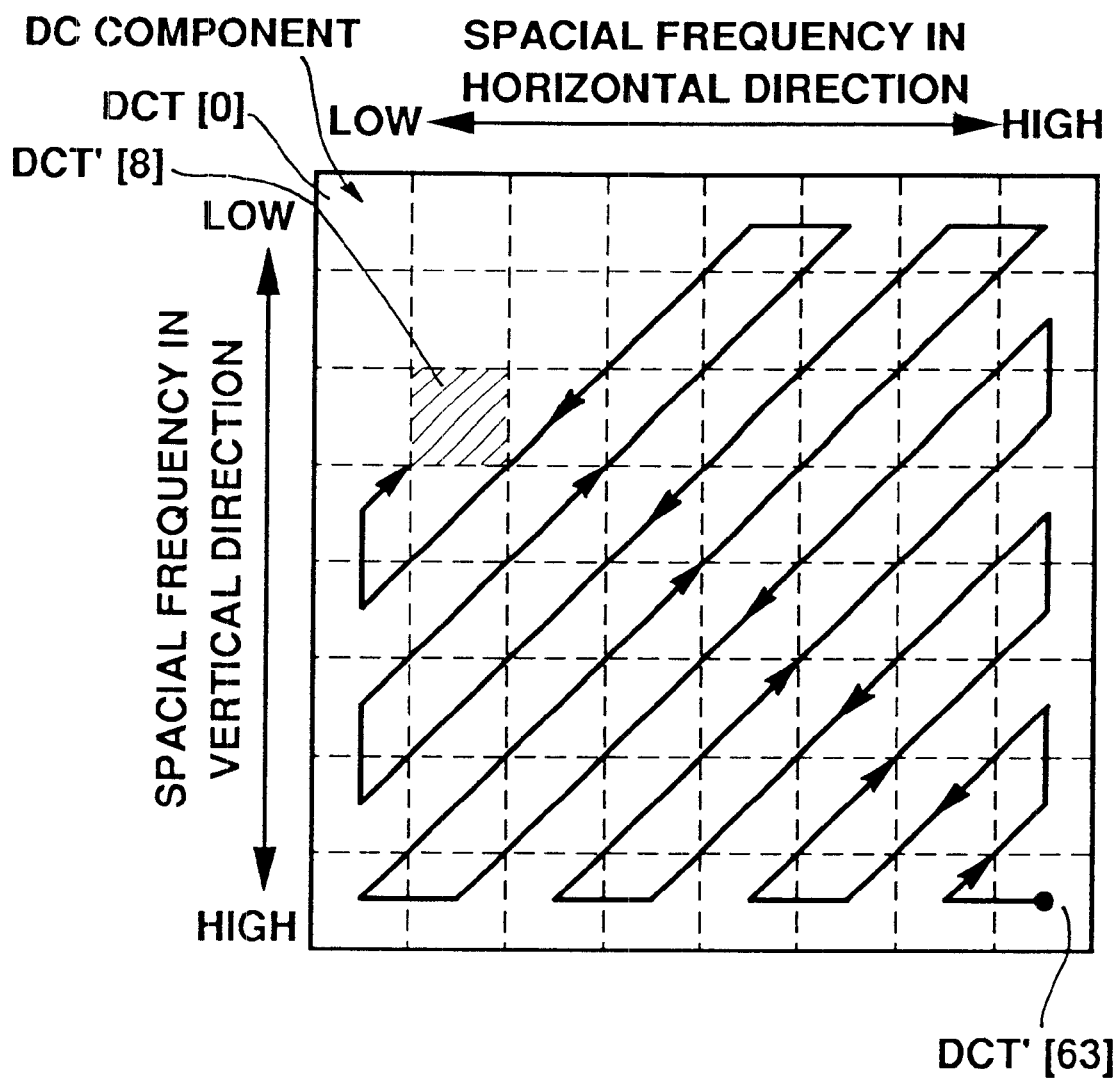
FIG. 19B is a diagram showing the state of reverse scanning of the block illustrated in FIG. 19A.
Figure 19C:
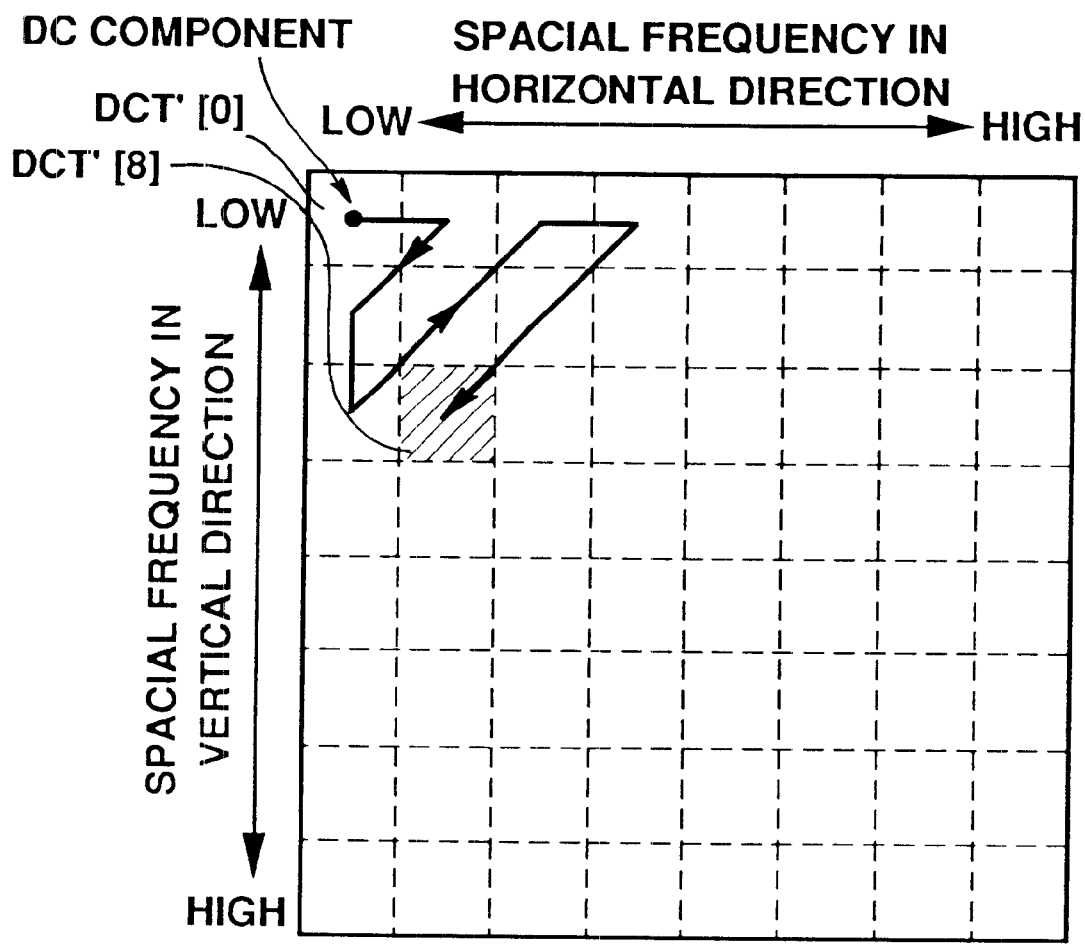
FIG. 19C is a diagram showing the state of forward scanning of the block illustrated in FIG. 19A.

FIG. 19A is a diagram for describing the manner in which coefficients occur within a block after DCT has been applied, FIG. 19B is a diagram showing the state of reverse scanning, and FIG. 19C is a diagram showing the state of forward scanning.

In FIG. 19A, let the shaded portions indicate components where significant coefficients of some kind have occurred, and let the frequency components of the blank portions be "0". In order to facilitate the description, it will be assumed that there are no components of significant coefficients converted to "0" by quantization. First, by reverse scanning, addresses at which significant coefficients are generated are searched for while quantization is applied in zigzag fashion from DCT[63] in the direction indicated by the arrow. As shown in FIG. 19A, the generation of significant coefficients is concentrated in the low-frequency region (the upper left-hand corner of the block), and therefore a significant coefficient is first generated at DCT'[8] (FIG. 19B). As illustrated in the embodiment of FIG. 16, DCT'[n] represents the result of quantizing DCT[n]. In this case, the count in counter 1112 is i=55. Now scanning of DCT [0] starts in the forward direction, and the coding of one block ends when the relation j=8 is established, namely when coding up to DCT'[8] has been achieved (FIG. 19C).

By adopting such an operation, the coding of one block is possible in a predetermined period of time, e.g., in an n×m block, a time in which the counters 1112, 1113 count a time of i+j=n×m−1. In other words, when the reading and coding of one component takes place in one clock, a time of (n×m+1) clocks, inclusive also of time i=0, j=0.

As many apparently widely different embodiments of the present invention can be made without departing from the spirit and scope thereof, it is to be understood that the invention is not limited to the specific embodiments thereof except as defined in the appended claims.

What is claimed is:

1. An image compressing apparatus comprising:
   input means for inputting all spatial frequency component data of a block which is one of a plurality of blocks constituting an image;
   discriminating means for discriminating an image type of the block according to the spatial frequency component data input by said input means; and
   quantizing means for quantizing all of the spatial frequency component data of the block input by said input means in accordance with the image type discriminated by said discriminating means,
   wherein said discriminating means discriminates the image type by comparing a single absolute value of the spatial frequency component data with a predetermined value.

2. The apparatus according to claim 1, wherein the image type is discriminated using an edge component of the block.

3. The apparatus according to claim 1, wherein the spatial frequency component data is obtained from a multivalued image signal from a computer or from an image scanner.

4. The apparatus according to claim 1, wherein said discriminating means discriminates based on an AC-power value within a high-frequency region in an orthogonal-transformed system.

5. The apparatus according to claim 4, wherein the AC-power values in the high-frequency region are scanned from high-frequency components to low-frequency components.

6. The apparatus according to claim 1, further comprising selecting means for selecting a quantizing parameter based on the ratio of the sum of powers in the low-frequency region of an orthogonal-transformed system to the sum of powers in the high-frequency region of the orthogonal-transformed system.

7. An image compressing method comprising the steps of:
   inputting all spatial frequency component data of a block which is one of a plurality of blocks which constitute an image;
   discriminating an image type of the block according to the spatial frequency component data input in said inputting step; and
   quantizing all of the spatial frequency component data of the block input in said inputting step in accordance with the image type discriminated by said discriminating step,
   wherein said discriminating step discriminates the image type by comparing a single absolute value of the spatial frequency component data with a predetermined value.

8. An image processing apparatus comprising:

inputting means for inputting n×m pixels of block data, constituting one of a plurality of blocks constituting a given body of image data;

transforming means for orthogonally transforming the block data into n×m spatial frequency component data; and output means for selecting an output order from a first order and a second order, the second order being the reverse of the first order, and outputting the n×m spatial frequency component data in the selected output order.

9. An image processing apparatus according to claim 8, wherein n=m=8.

10. An image processing apparatus according to claim 8, wherein spatial frequency component data are output from high frequency component to low frequency component in the first order, and wherein spatial frequency component data are output from low frequency component to high frequency component in the second order.

11. An image data processing apparatus according to claim 8, further comprising discriminating means for discriminating an image type of the block data input by said inputting means, wherein an outputting order of spatial frequency data in said output means is determined based on the image type discriminated by said discriminating means.

12. An image processing apparatus according to claim 8, wherein said output means comprises a plurality of address generators which generate a reading address of storing means for storing the n×m spatial frequency component data, each said address generator corresponding to a respective predetermined order.

13. An image processing apparatus according to claim 8, wherein said output means changes an order of outputting spatial frequency component data while said output means is outputting the spatial frequency component data.

14. An image processing apparatus comprising:

inputting means for inputting n×m pixels constituting a block which is one of a plurality of blocks constituting a given body of image data;

transforming means for orthogonally transforming the block data into n×m spatial frequency component data;

decision means for deciding a quantizing method from among a plurality of quantizing methods, which respectively correspond to a plurality of image types, based on an image type discriminated in accordance with the n×m spatial frequency component data obtained by said transforming means; and quantizing means for quantizing all of the n×m spatial frequency component data obtained by said transforming means using the quantizing method decided by said decision means, wherein, in said decision means, the image type is discriminated by comparing a single absolute value of the spatial frequency component data with a predetermined value.

15. An image processing apparatus, comprising:

transforming means for orthogonally transforming image data into spatial frequency component data;

detecting means for detecting a characteristic of the image data based on the spatial frequency component data;

a plurality of table means for respectively storing quantizing parameters; and quantization means for quantizing all of the spatial frequency component data by using quantizing parameters stored in one of said plurality of table means, which table means is selected according to the characteristic of the data detected by said detecting means, wherein said detecting means detects the characteristic of the image data by comparing a single absolute value of the spatial frequency component data with a predetermined value.

16. The apparatus according to claim 1, wherein said discriminating means comprises means for discriminating the image type of the block by comparing each of the plurality of spatial frequency component data with a predetermined value.

17. The method according to claim 7, wherein said discriminating step comprises a step of discriminating the image type of the block by comparing each of the plurality of spatial frequency component data with a predetermined value.

18. An image processing method comprising the steps of:

inputting n×m pixels of block data, constituting one of a plurality of blocks constituting a given body of image data;

orthogonally transforming the block data into n×m spatial frequency component data;

selecting an output order from a first order and a second order, the second order being the reverse of the first order; and outputting the n×m spatial frequency component data the selected output order.

19. An image processing method comprising the steps of:

inputting n×m pixels constituting a block which is one of a plurality of blocks constituting a given body of image data;

orthogonally transforming the block data into n×m spatial frequency component data;

deciding a quantizing method from among a plurality of quantizing methods, which respectively correspond to a plurality of image types, based on an image type discriminated in accordance with the n×m spatial frequency component data obtained by said transforming step; and quantizing all of the n×m spatial frequency component data obtained by said transforming step using the quantizing method decided by said deciding step, wherein, in said deciding step, the image type is discriminated by comparing a single absolute value of the spatial frequency component data with a predetermined value.

20. An image processing method for processing image data using a plurality of table means which respectively store quantizing parameters, said method comprising the steps of:

orthogonally transforming image data into spatial frequency component data;

detecting a characteristic of the image data based on the spatial frequency component data; and quantizing all of the spatial frequency component data by using quantizing parameters stored in one of said plurality of table means, which table means is selected according to the characteristic of the image data detected by said detecting step, wherein said detecting step detects the characteristic of the image data by comparing a single absolute value of the spatial frequency component data with a predetermined value.

21. An image processing apparatus according to claim 14, wherein n=m=8.

22. An image processing apparatus according to claim 14, wherein said transforming means performs DCT coding processing.

23. An image processing apparatus according to claim 14, wherein said quantizing means obtains AC component data and DC component data by quantizing all of the n×m spatial frequency component data, and outputs the AC component and the DC component through different terminals respectively.

24. An image processing apparatus according to claim 14, wherein said transforming means performs zigzag scanning to convert the n×m spatial frequency component data into one dimensional data in which the frequency component data are arranged in a order corresponding to frequency of each component.

* * * * *

UNITED STATES PATENT AND TRADEMARK OFFICE
CERTIFICATE OF CORRECTION

PATENT NO.    : 6,546,145 B1
DATED         : April 8, 2003
INVENTOR(S)   : Nobutaka Miyake et al.

Figure 1:
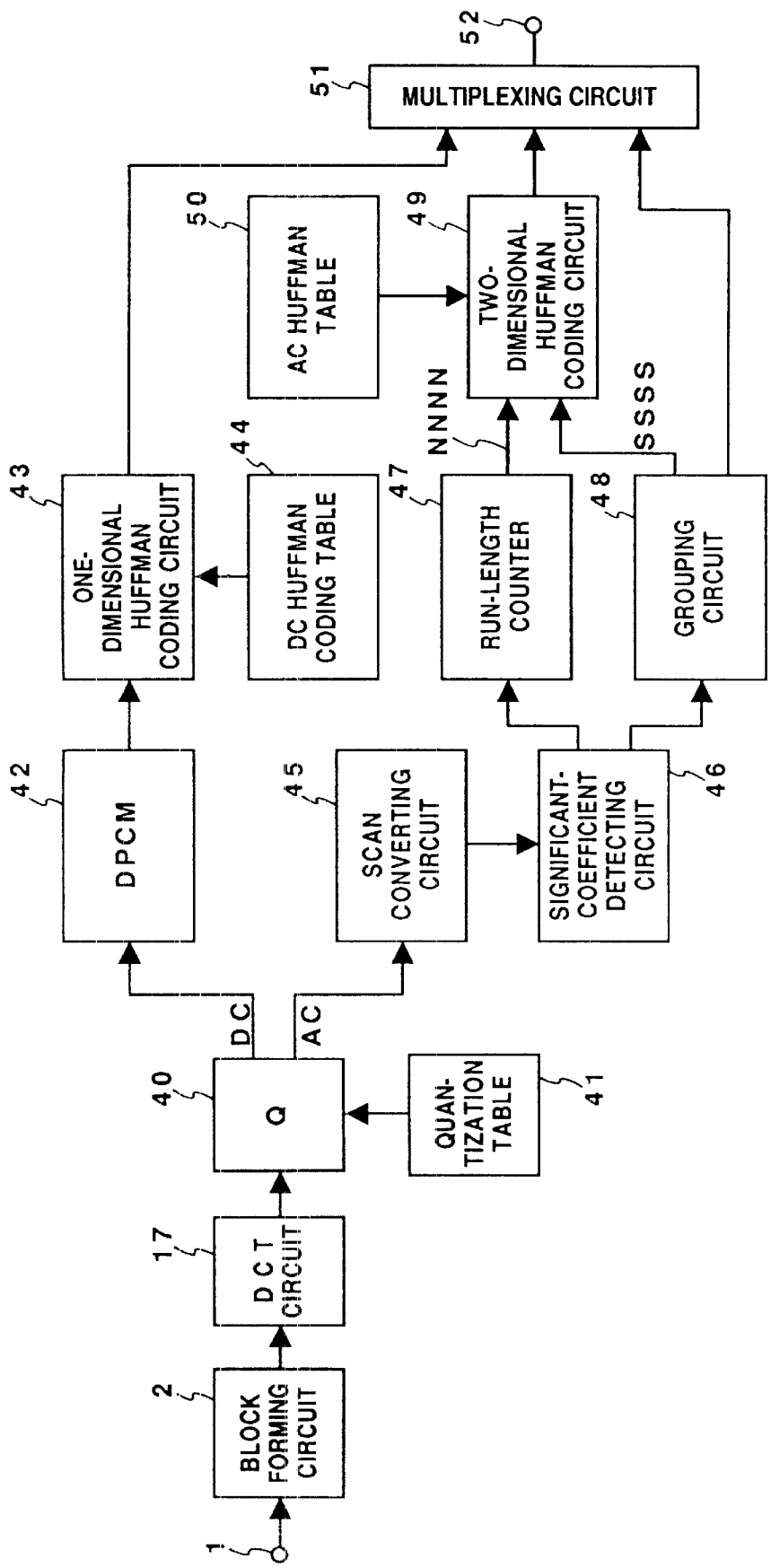
FIG. 1 is a block diagram showing the construction of an image compressing apparatus according to the prior art.
Figure 2:
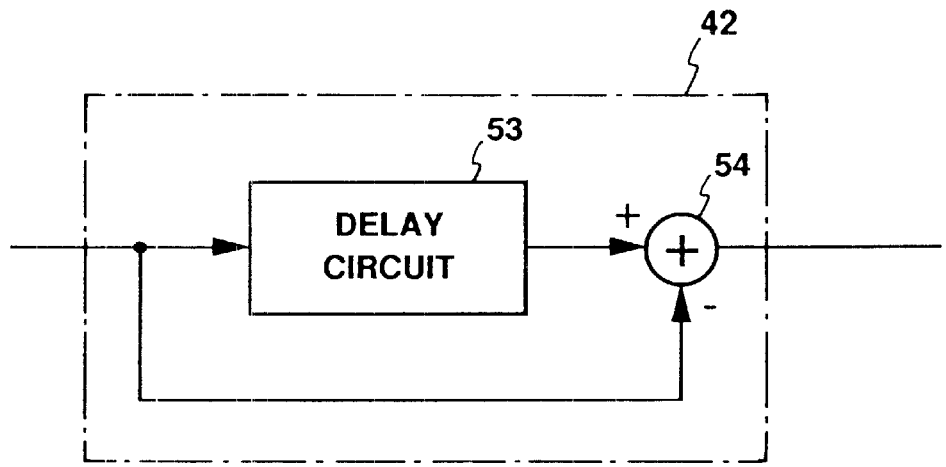
FIG. 2 is a block diagram showing the detailed construction of a predictive coding circuit according to the prior art.
Figure 3:
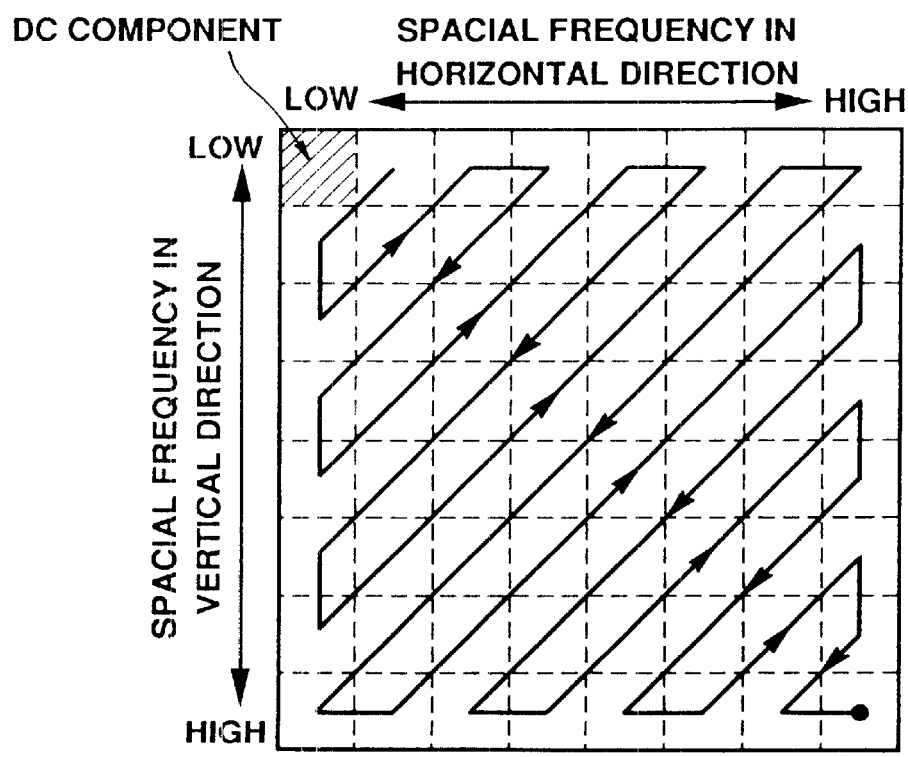
FIG. 3 is a diagram showing the scanning sequence of DCT coefficients.
Figure 4:
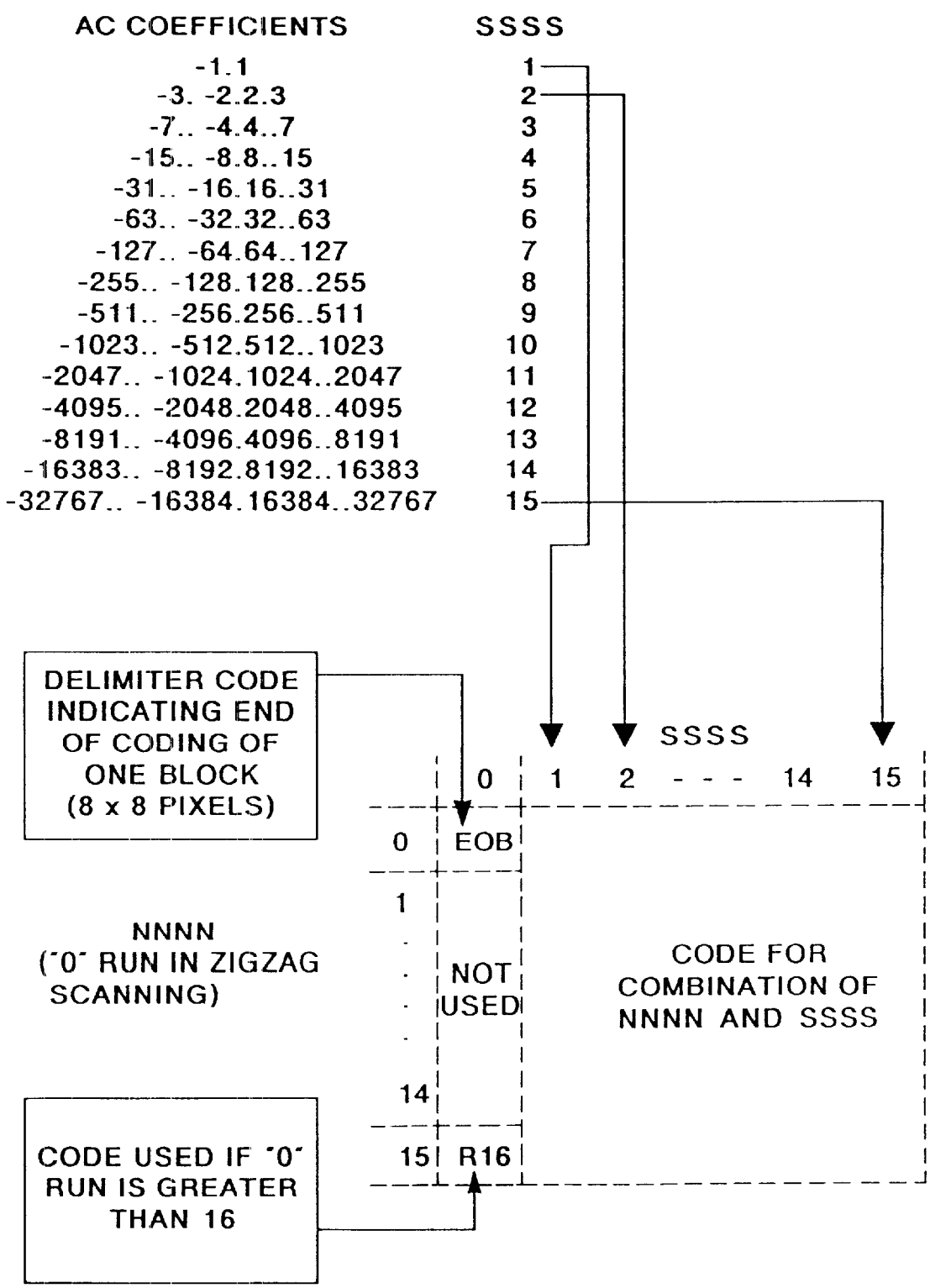
FIG. 4 is a diagram for describing the relationship between AC coefficients and group numbers SSSS.

It is certified that error appears in the above-identified patent and that said Letters Patent is hereby corrected as shown below:

Drawings,
Sheet 2, Fig. 3, "SPACIAL" (both occurrences) should read -- SPATIAL --.
Sheet 6, Fig. 7, "SPACIAL" (both occurrences) should read -- SPATIAL --.
Sheet 7, Fig. 8, "SPACIAL" (both occurrences) should read -- SPATIAL --.
Sheet 15, Fig. 16, "CIRUIT" should read -- CIRCUIT--.
Sheet 18, Fig. 18, "CIRUIT" should read -- CIRCUIT--.
Sheet 19, Fig. 19A, "SPACIAL" (both occurrences) should read -- SPATIAL --.
Sheet 20, Fig. 19B, "SPACIAL" (both occurrences) should read -- SPATIAL --.
Sheet 21, Fig. 19C, "SPACIAL" (both occurrences) should read -- SPATIAL --.

Column 2,
Line 65, "entered" should read -- been entered --.

Column 3,
Line 27, "consecutive" should read -- consecutive "O"s. --.

Column 4,
Lines 23 and 33, "provide" should read -- proivides --.
Line 25, "date" should read -- data --.
Line 29, "method" should read -- methods --.
Line 54, "step." should read -- steps. --.

Column 6,
Line 17, "different" should read -- different from --.
Line 24, "a" should read -- an --.

Column 9,
Line 51, "means" should read -- mean --.

Column 10,
Line 7, "to 10" should read -- to --.

Column 12,
Line 19, "for." should read -- for --.
Line 64, "step 105." should read -- step S105 --.

UNITED STATES PATENT AND TRADEMARK OFFICE
CERTIFICATE OF CORRECTION

PATENT NO.   : 6,546,145 B1
DATED        : April 8, 2003
INVENTOR(S)  : Nobutaka Miyake et al.

It is certified that error appears in the above-identified patent and that said Letters Patent is hereby corrected as shown below:

Column 13,
Line 33, "is selected" should be deleted.

Column 16,
Line 28, "data" should read -- data in --.

Column 18,
Line 6, "a" should read -- an --.

Signed and Sealed this

Fourteenth Day of September, 2004

JON W. DUDAS
*Director of the United States Patent and Trademark Office*